(12) United States Patent
Ezaki et al.

(10) Patent No.: US 7,072,954 B1
(45) Date of Patent: Jul. 4, 2006

(54) NETWORK MANAGEMENT SYSTEM HAVING ACCESS MANAGER FOR MANAGING ACCESS TO RECORDING MEDIUM APPARATUS

(75) Inventors: Toshihiro Ezaki, Osaka (JP); Asanobu Ito, Kyoto (JP); Minoru Nishioka, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/536,633

(22) Filed: Mar. 28, 2000

(30) Foreign Application Priority Data

Mar. 29, 1999 (JP) ................................. 11-085818

(51) Int. Cl.
*G06F 15/16* (2006.01)
*G06F 15/173* (2006.01)
*G06F 11/00* (2006.01)
*G06F 12/00* (2006.01)

(52) U.S. Cl. ...................... 709/223; 709/203; 709/219; 709/224; 709/225; 709/229; 370/230; 711/141; 711/145

(58) Field of Classification Search ................ 709/219, 709/223, 224, 203, 217, 218, 220, 225–229, 709/235, 249; 713/200–202; 370/229–232, 370/235; 711/141, 144–146, 150; 707/8
See application file for complete search history.

(56) References Cited

U.S. PATENT DOCUMENTS

| | | | | |
|---|---|---|---|---|
| 5,319,641 A | * | 6/1994 | Fridrich et al. | 370/447 |
| 5,530,845 A | * | 6/1996 | Hiatt et al. | 703/27 |
| 5,768,623 A | * | 6/1998 | Judd et al. | 710/37 |
| 5,815,492 A | * | 9/1998 | Berthaud et al. | 370/234 |
| 5,819,084 A | * | 10/1998 | Shapiro et al. | 707/10 |
| 5,924,094 A | * | 7/1999 | Sutter | 707/10 |
| 5,944,824 A | * | 8/1999 | He | 713/201 |

(Continued)

FOREIGN PATENT DOCUMENTS

JP 10-111761 4/1998

(Continued)

OTHER PUBLICATIONS

Lim, J.B., et al. "Concurrent Data Access in Mobile Heterogeneous Systems," Proceedings of the 32nd Annual Hawaii Intl. Conference on System Science, vol. Track8, Jan. 8, 1999, pp. 1-10.*

(Continued)

*Primary Examiner*—Rupal Dharia
*Assistant Examiner*—Melvin H. Pollack
(74) *Attorney, Agent, or Firm*—Wenderoth, Lind & Ponack, L.L.P.

(57) ABSTRACT

A network management system is provided in which a transmission band for preceding access is guaranteed even when simultaneous access to shared data is obtained by plural nodes and which does not suffer any problem even in the case of accessing to data that requires real-timeness such as with video data. In order to guarantee an I/O band for a hard disc and a band for the network when simultaneous access by plural nodes to shared data is obtained, an access manager for controlling access bands is provided inside the system, which guarantees a transmission band for preceding access on the occasion of simultaneous access by plural nodes by making mode-of-access judgment, managing the network band and the hard disc I/O transmission band, and judging whether or not to approve the access based on whether or not the bands are saturated.

37 Claims, 17 Drawing Sheets

U.S. PATENT DOCUMENTS

| | | | | |
|---|---|---|---|---|
| 5,961,594 | A * | 10/1999 | Bouvier et al. | 709/223 |
| 5,963,745 | A * | 10/1999 | Collins et al. | 712/13 |
| 5,968,176 | A * | 10/1999 | Nessett et al. | 713/201 |
| 5,991,811 | A * | 11/1999 | Ueno et al. | 709/231 |
| 5,996,025 | A * | 11/1999 | Day et al. | 709/328 |
| 6,038,214 | A * | 3/2000 | Shionozaki | 370/230 |
| 6,061,504 | A * | 5/2000 | Tzelnic et al. | 709/219 |
| 6,088,451 | A * | 7/2000 | He et al. | 713/201 |
| 6,088,737 | A * | 7/2000 | Yano et al. | 709/235 |
| 6,091,725 | A * | 7/2000 | Cheriton et al. | 370/392 |
| 6,104,700 | A * | 8/2000 | Haddock et al. | 370/235 |
| 6,108,750 | A * | 8/2000 | Yamamoto et al. | 711/112 |
| 6,115,390 | A * | 9/2000 | Chuah | 370/443 |
| 6,158,010 | A * | 12/2000 | Moriconi et al. | 713/201 |
| 6,178,418 | B1 * | 1/2001 | Singer | 707/3 |
| 6,185,573 | B1 * | 2/2001 | Angelucci et al. | 707/104.1 |
| 6,205,143 | B1 * | 3/2001 | Lemieux | 370/395.61 |
| 6,219,669 | B1 * | 4/2001 | Haff et al. | 707/10 |
| 6,243,676 | B1 * | 6/2001 | Witteman | 704/243 |
| 6,253,259 | B1 * | 6/2001 | Hirabayashi et al. | 710/5 |
| 6,295,575 | B1 * | 9/2001 | Blumenau et al. | 711/5 |
| 6,321,272 | B1 * | 11/2001 | Swales | 709/250 |
| 6,324,581 | B1 * | 11/2001 | Xu et al. | 709/229 |
| 6,330,609 | B1 * | 12/2001 | Garofalakis et al. | 709/229 |
| 6,332,160 | B1 * | 12/2001 | Tabuchi | 709/224 |
| 6,345,038 | B1 * | 2/2002 | Selinger | 370/230 |
| 6,356,903 | B1 * | 3/2002 | Baxter et al. | 707/10 |
| 6,360,219 | B1 * | 3/2002 | Bretl et al. | 707/8 |
| 6,374,336 | B1 * | 4/2002 | Peters et al. | 711/167 |
| 6,381,602 | B1 * | 4/2002 | Shoroff et al. | 707/9 |
| 6,401,097 | B1 * | 6/2002 | McCotter et al. | 707/102 |
| 6,404,735 | B1 * | 6/2002 | Beshai et al. | 370/230 |
| 6,405,218 | B1 * | 6/2002 | Boothby | 707/201 |
| 6,421,711 | B1 * | 7/2002 | Blumenau et al. | 709/213 |
| 6,425,060 | B1 * | 7/2002 | Mounes-Toussi et al. | 711/158 |
| 6,445,679 | B1 * | 9/2002 | Taniguchi et al. | 370/232 |
| 6,449,653 | B1 * | 9/2002 | Klemets et al. | 709/231 |
| 6,453,354 | B1 * | 9/2002 | Jiang et al. | 709/229 |
| 6,523,130 | B1 * | 2/2003 | Hickman et al. | 714/4 |
| 6,546,017 | B1 * | 4/2003 | Khaunte | 370/412 |
| 6,567,980 | B1 * | 5/2003 | Jain et al. | 725/61 |
| 6,574,654 | B1 * | 6/2003 | Simmons et al. | 718/104 |
| 6,587,433 | B1 * | 7/2003 | Borella et al. | 370/230 |
| 6,594,698 | B1 * | 7/2003 | Chow et al. | 709/226 |
| 6,684,360 | B1 * | 1/2004 | Ito et al. | 714/752 |

FOREIGN PATENT DOCUMENTS

| | | | |
|---|---|---|---|
| JP | 10-308776 | | 11/1998 |
| JP | 2000278290 | A * | 10/2000 |
| JP | 2001256001 | A * | 9/2001 |
| JP | 2004343371 | A * | 12/2004 |

OTHER PUBLICATIONS

Nilsson, Hakan and Stenstrom, Per. "The Scalable Tree Protocol—A Cache Coherence Approach for Large-Scale Multiprocessors," Proceedings of the 4th IEEE Symposium on Parallel and Distributed Processing, Dec. 4, 1992, pp. 498-506.*

Bautz, R. "Computerized Management of Distribution Network with a Cadastral Integrator," 12th Intl. Conference on Electricity Distribution, vol. 6, May 21, 1993, pp. 6.25.1-6.25.6.*

Chang, Jae Youl and Lee, Byung Kwan. "Adaptive Replicated Object with Cache Coherence in Distributed Shared Memory," Fifth Asia-Pacific Conference on Communications, vol. 2, Oct. 22, 1999, pp. 1134-1138.*

Garlick, Larry. "Out-of-Band Control Signals in a Host-to-Host Protocol," RFC 721, Sep. 1, 1976.*

Jamoussi, B. et al. "Nortel's Virtual Network Switching (VNS) Overview," RFC 2340, May 1998.*

* cited by examiner

NETWORK MANAGEMENT SYSTEM HAVING ACCESS MANAGER FOR MANAGING ACCESS TO RECORDING MEDIUM APPARATUS

FIELD OF THE INVENTION

The present invention relates to a network management system, in particular to a network management system which manages the transmission bands for simultaneous access from plural nodes to specific data and guarantees access transmission bands.

BACKGROUND OF THE INVENTION

In order to allow sharing of data stored on a hard disc by plural users, conventional network management systems are generally provided with a database for managing management information such as stored locations of all data on a network and names of files. There occurs a situation where more than one user simultaneously requests access to the data conforming to the data management information. To realize such access requests, there exists a network management system as shown in the block diagram of FIG. 17.

In the prior art system configuration of FIG. 17, N number of units of nodes 1701 to 170N having a functionality of a personal computer, for example, and a database 1704 are connected through an Ethernet network. Also, a hard disc 1705 having data 1706 is connected to the database 1704. Referring to FIG. 17, a description will be given in the following for the case of two or more nodes simultaneously having access to the same data.

In general, when a node (1) 1701 is having read access to the data 1706, access from other nodes to the data 1706 is approved only when it is read access. However, when plural nodes execute simultaneous read access to the data 1706 in this way, the data transfer rate per node becomes lower with increasing number of nodes which have access as the transmission band of the network and the input/output (I/O) band of the hard disc are divided by the number of nodes that have access. This reduction in the bands has not caused any problem when having access to data that does not require real-timeness.

In the prior art network management system described above, when simultaneous access from plural nodes to the same data is executed, there is a risk of data transfer being interrupted as the transmission band of the network for each node and the I/O band of the hard disc are not guaranteed; for instance, when having access to a stream of data such as video data which requires real-timeness, it suffers a problem of not being able to guarantee bands to a node which is having preceding read access.

SUMMARY OF THE INVENTION

An object of the present invention is to provide a network management system which is capable of guaranteeing transmission bands for access to a node the access from which has been approved.

In order to achieve the object, the present invention provides a system comprising a plurality of nodes, a recording medium apparatus for storing data, data management means for managing the data on the recording medium apparatus, and access management means for managing access to the data in the recording medium apparatus, which are connected through a network.

With this configuration, when there is an access request for data raised from a node to the access management means, the access management means manages, in cooperation with the data management means, the judgment of the mode of access and the band of the network and the band of the interface of the recording medium apparatus, thus guaranteeing the bands for accessing from the node to the recording medium apparatus through the network.

DESCRIPTION OF THE PREFERRED EMBODIMENTS

Referring to drawings, a description of the exemplary embodiments of the present invention will be given in the following.

Exemplary Embodiment—1

Figure 1:
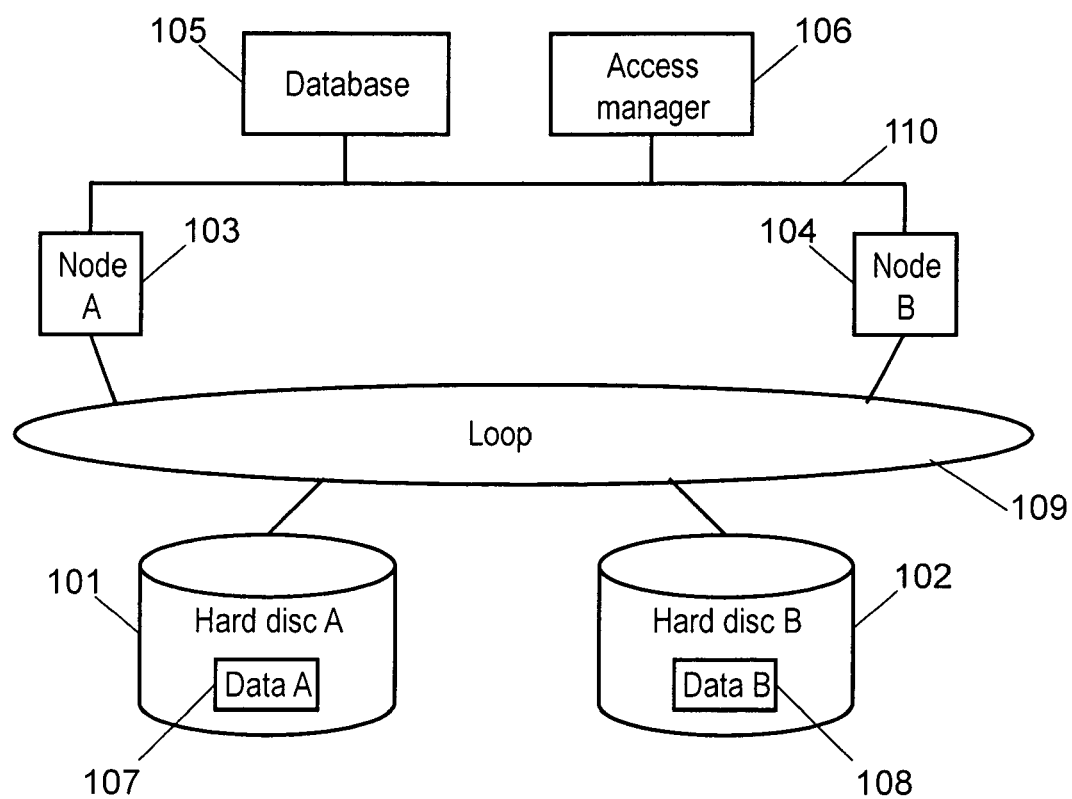
FIG. 1 is a block diagram illustrating the configuration of a network management system in a first exemplary embodiment of the present invention.

FIG. 1 is a block diagram illustrating an example configuration of a network management system in a first exemplary embodiment of the present invention. In the diagram, a hard disc A 101 and a hard disc B 102 are connected to a node A 103 and node B 104 as respective local discs within the same loop 109. Here, a local disc means a hard disc on a network allocated for usual use by each node. Also, each node is connected through a separate network 110 to a database 105, being data management means for managing data information stored on a hard disc, and to an access manager 106, being access managing means for managing access to data.

For the purpose of describing characteristics of each processing unit and the communication procedure of the network management system of FIG. 1, examples will be given for the cases of (1) node A 103 having read access to data A 107 stored on the hard disc A 101 and of (2) node B 104 having write access to the hard disc B 102 to write data B 108.

To begin with, a description will be given for the case (1) of having read access using the network management system.

The node A 103 sends an access request to the access manager 106 through the network 110 for access to the data A 107 on the hard disc A 101. Upon receiving the access request, the access manager 106 requests the database 105 for data management information of the data A 107 through the network 110. The database 105 sends a response to the access manager 106. Upon receiving the data management information, the access manager 106 judges whether or not to approve the access based on the judgment of the mode of access, and the band of the network and the I/O band of the hard disc. When the result of judgment is to approve the access, the access manager 106 sends access approval and data management information to the node A 103 after registering the access state and securing an I/O band for the hard disc and a band for the network 109.

Upon receiving the access approval and data management information, the node A 103 commences read access to the data A 107 through the network 109, and sends an access state deletion command to the access manager 106 upon completion of the access. The access manager 106 deletes the access state and releases the secured bands.

Next, a description will be given on the above case (2) of having write access using the network management system.

The node B 104 sends to the access manager 106 a write access request for the data B 108 on the hard disc B 102 through the network 110. Upon receiving the write access request, the access manager 106 requests the database 105 through the network 110 for write start position information of a sector of the hard disc B 102 on which to store the data B 108, and the database 105 sends the information back. Upon receiving the write start position information of the sector, the access manager 106 judges whether or not to approve the access based on the judgment of the mode of access and the band for the network and the I/O band for the hard disc; when the result of judgment is to approve the access, it sends to the node B 104 access approval and write start position information of the sector after registering the access state and securing an I/O band for the hard disc and a band for the network.

Upon receiving the access approval and the write start position information of the sector, the node B 104 executes writing (write access) of the data B 108 on the hard disc B 102 through the network 109; immediately upon completion of writing, the node B 104 sends data management information of the sector to the database 105 through the network 110 and via the access manager 106. This communication of data management information in blocks of sectors is continued until completion of writing the entire data B 108. Upon completion of the writing of the data B 108, the node B 104 sends an access state deletion command to the access manager 106, and the access manager 106 deletes the access state and releases the secured bands.

In this exemplary embodiment, although data management information was sent in blocks of sectors, sending of the data management information is not limited to be made in blocks of sectors; it may be sent in blocks of data such as by data blocks or data clusters.

Also, though writing of data on a local disc by each node was described by way of an example, writing on a local disc of other nodes is also possible by making similar processing. In the following description, local discs of other nodes and a shared disc accessible by all nodes are referred to as remote discs.

As has been described above for the example cases of having read access and write access, it is possible to manage the I/O band for the hard disc and the band for the network during the time of access by the access manager 106 in the network.

Figure 2:
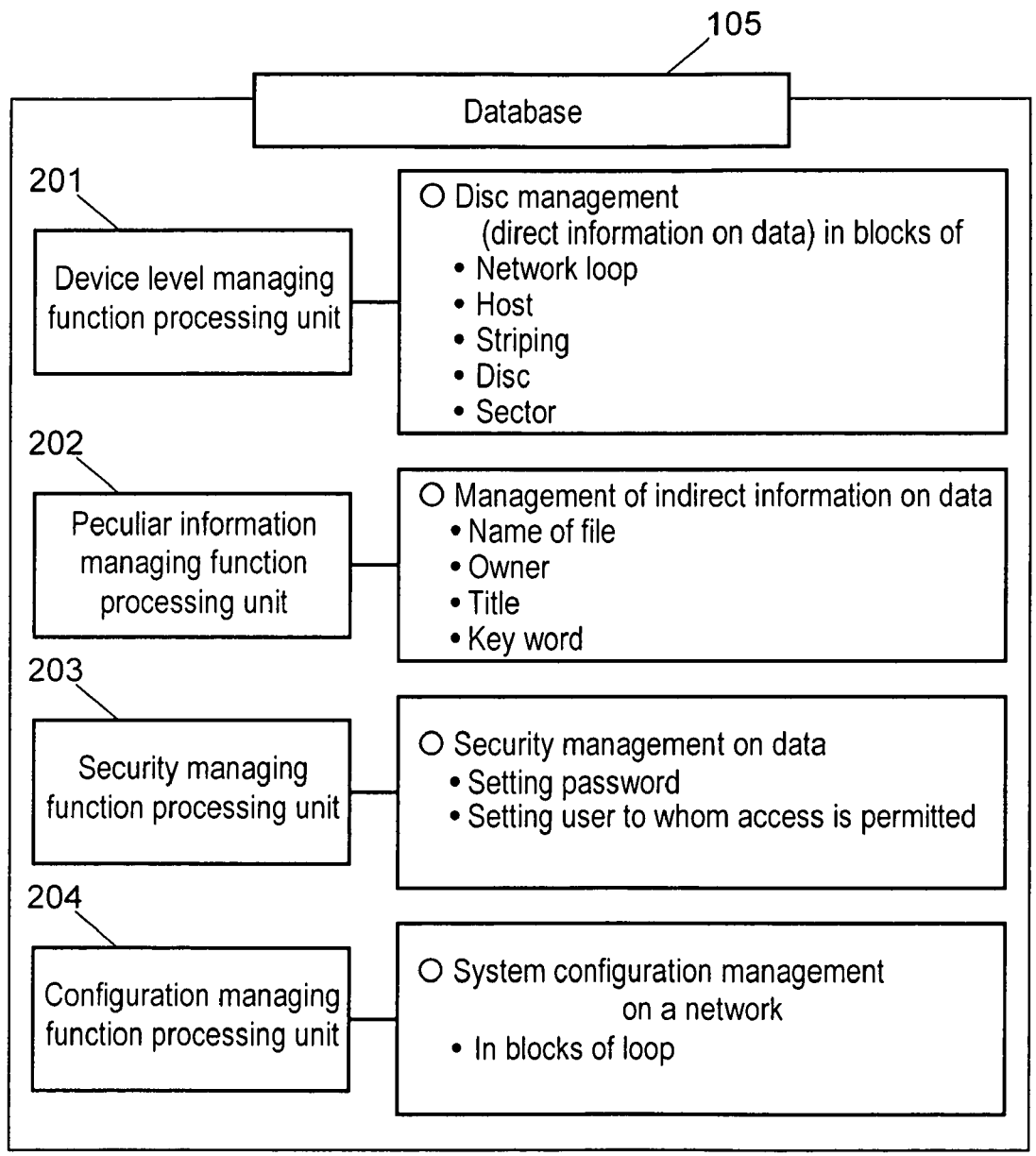
FIG. 2 is a diagram illustrating each of managing function processing units of a database of the network management system.

Next, referring to FIG. 2, a description on the detailed function of the database 105 in FIG. 1 will be given. FIG. 2 is a diagram showing each of the managing function processing units of the database 105.

As shown in FIG. 2, the database 105 manages data management information employing four units, namely, a device level managing function processing unit 201, distinctive information managing function processing unit 202, security managing function processing unit 203, and configuration managing function processing unit 204.

A specific description of each of the managing function processing units will be given in the following.

The device level managing function processing unit 201 handles management of all the discs. For example, it manages the location of data storage on a disc or empty region of a disc for each individual network, loop on a network, host, striping, disc, and, further, sector of each disc. The distinctive information managing function processing unit 202 manages distinctive information concerning the data such as file name, owner, title, keyword of the data. The security managing function processing unit 203 manages security function such as setting of password for each individual disc or data, and registration of the name of user who can have access. The configuration managing function processing unit 204 manages the items of system configuration to be manually registered when installing the hardware.

By using each of the above-described managing function processing units, data management information concerning the data is managed by the database 105.

Figure 3:
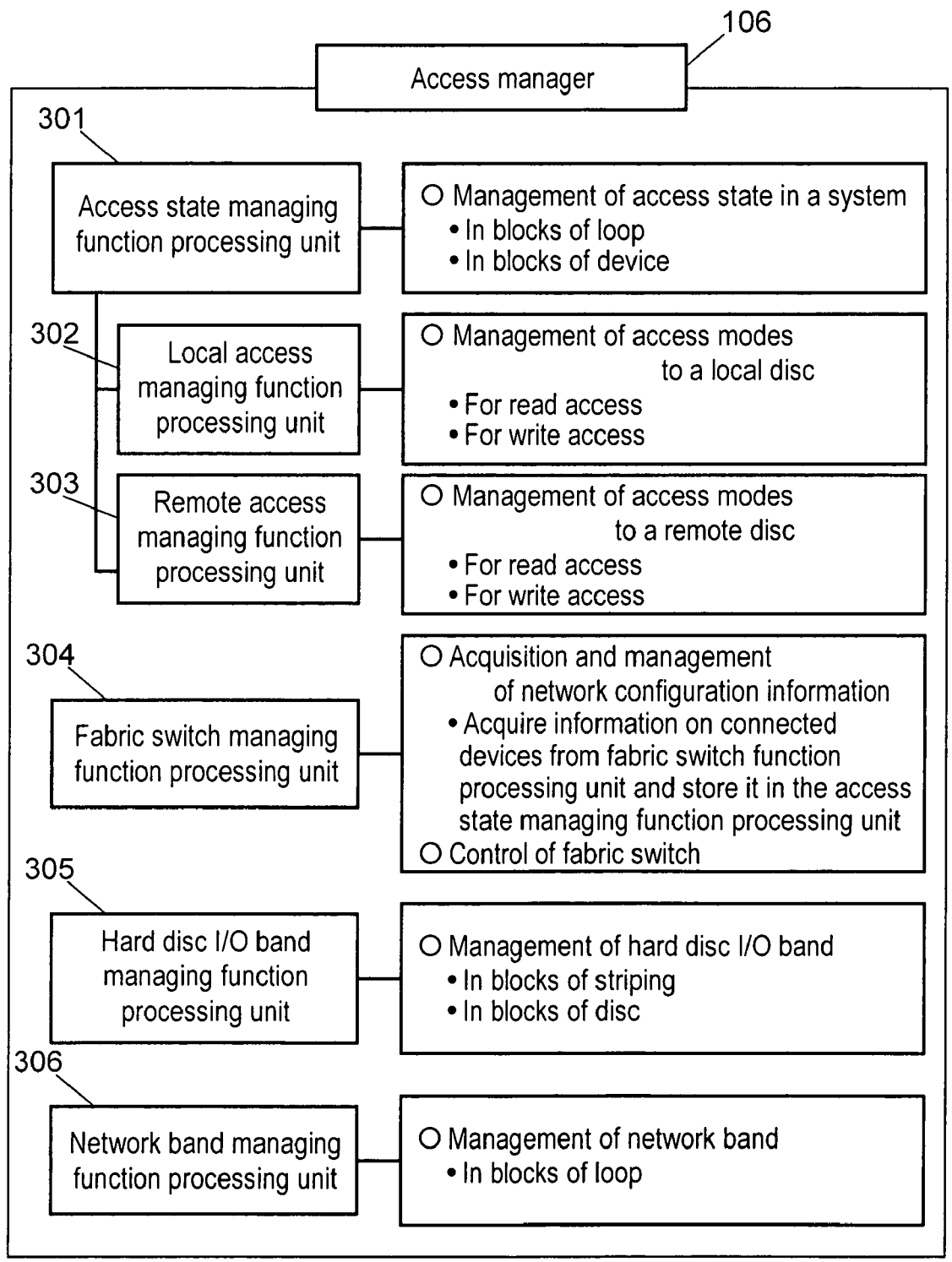
FIG. 3 is a diagram illustrating each of managing function processing units of an access manager of the network management system.

The function of the access manager 106 as shown in FIG. 1 will now be described in greater detail with reference to FIG. 3. FIG. 3 shows diagrammatically each of the managing function processing units of the access manager 106.

As shown in FIG. 3, the access manager 106 manages access to the data by using four units, namely, an access state managing function processing unit 301, a fabric switch managing function processing unit 304, a hard disc I/O band managing function processing unit 305, and a network band managing function processing unit 306. Action of each of the managing function processing unit will be described in the following.

The access state managing function processing unit 301 comprises a local access managing function processing unit 302 which manages access of a node to a local disc and a remote access managing function processing unit 303 which manages access of a node to a remote disc. In order to manage the access state within a system, the access state managing function processing unit 301 communicates with all the nodes under operation and a fabric switch, acquires all status information within the network, thereby performing unified management. It also grasps whether preceding access to a hard disc to which an access request has been made is for reading or for writing and manages the access state.

Furthermore, in the local access managing function processing unit 302, read/write access to a local disc is managed, whereas in the remote access managing function processing unit 303, read/write access to a remote disc is managed.

The fabric switch managing function processing unit 304 acquires network information which is managed by the fabric switch while controlling the interconnection between ports of the fabric switch. However, as the system configuration of the present exemplary embodiment as illustrated in FIG. 1 is not provided with a fabric switch, the function of the fabric switch managing function processing unit 304 is not utilized. The hard disc I/O band managing function processing unit 305 manages the I/O bands for all the hard discs within the network. The network band managing function processing unit 306 makes calculation of the band for the entire network and the band for each individual unit such as loop, for example, that composes the network, and manages the band of the network for each individual loop.

Using the above described managing function processing units, the access manager 106 manages access to the data.

Figure 4:
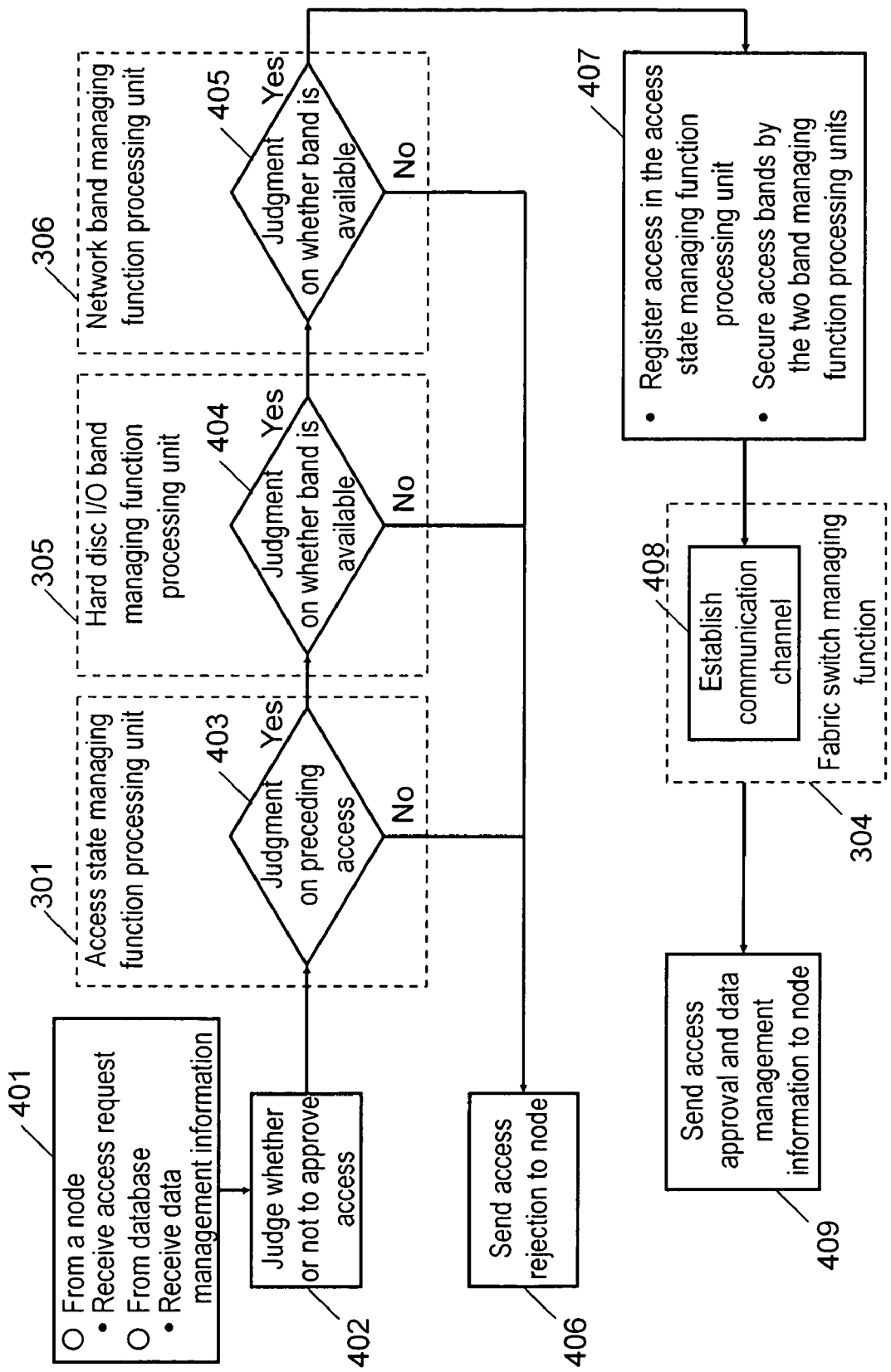
FIG. 4 is a block diagram of a process of judgment by the access manager as to whether or not to approve access in the network management system.

Next, a description of the procedure in the access manager 106 of judging whether or not to approve access will be given with reference to the judgment process block diagram in FIG. 4. In the access manager 106, a judgment process 402 is carried out as to whether or not to approve access after receiving (in the processing block 401) an access request from a node and data management information from the database, and the access state of the hard disc storing the data to which an access request has been made is investigated in the access state managing function processing unit 301 using the access state information.

In a judgment process 403, a "yes" judgment is made in the case of any one of (a) preceding access is write access, and the present access request is read access, (b) preceding access is read access, or (c) no preceding access exists.

Subsequently, in the I/O band managing function processing unit 305 of the hard disc, a "yes" judgment is made through a judgment process 404 when there is a sufficient margin in the I/O band for the hard disc; and, in the network band managing function processing unit 306, a "yes" judgment is made through a judgment process 405 when there is a sufficient margin in the network band.

When all of the conditions of the above judgment processes 403 to 405 are satisfied, access is registered in the access state managing function processing unit 301, and access bands are secured in the I/O band managing function processing unit 305 of the hard disc and the network band managing function processing unit 306 as shown in the processing block 407, and transmission 409 of access approval and data management information is made as the result of judgment. In the case of a system provided with a fabric switch, transmission 409 of access approval and data management information as the result of judgment is made after establishing an access channel (processing block 408) in the fabric switch managing function processing unit 304.

In the judgment process 403, when an access request is write access, access for writing to the same sector as reading is being executed is not approved but a write access request to other sectors is approved.

In case any one of the conditions of the above judgment processes 403 to 405 is not satisfied, an access rejection 406 is immediately sent to the node as the result of judgment.

On receiving the result of judgment, the node immediately commences access to the data when (1) the result of judgment is approval of the access, and suspends access execution when (2) the result of judgment is rejection of the access.

Using the above-described managing function, access in which transmission bands for access to the data are guaranteed is realized.

Here, the processing of the conditions for judgment (judgment processes 403 to 405) may be made in an arbitrary order.

Also, in this exemplary embodiment, although a description was given for the case of disc-by-disc management as the unit for management by the access manager 106, the unit to be managed is not limited to disc unit, and management may be made in units of the block, cluster, or sector. Furthermore, although a hard disc is provided in each node in the system configuration of the present exemplary embodiment, a recording region of a single hard disc may be allocated to each of the nodes or the system can be configured to have a shared hard disc.

As has been described above, as this embodiment enables management of the transmission bands to be used in each access when simultaneous access from plural nodes is being executed, access bands can be guaranteed in accessing a stream such as images and the like where transmission bands need to be guaranteed.

In this exemplary embodiment, separate loops are used for the network 109 that connects each node and the hard discs, and for the network 110 that connects each node, the access manager, and the database for the purpose of expanding the network bands to be used for accessing the hard discs as much as possible. However, when a sufficient network band is available, the networks do not need to be separate.

Exemplary Embodiment—2

Figure 5:
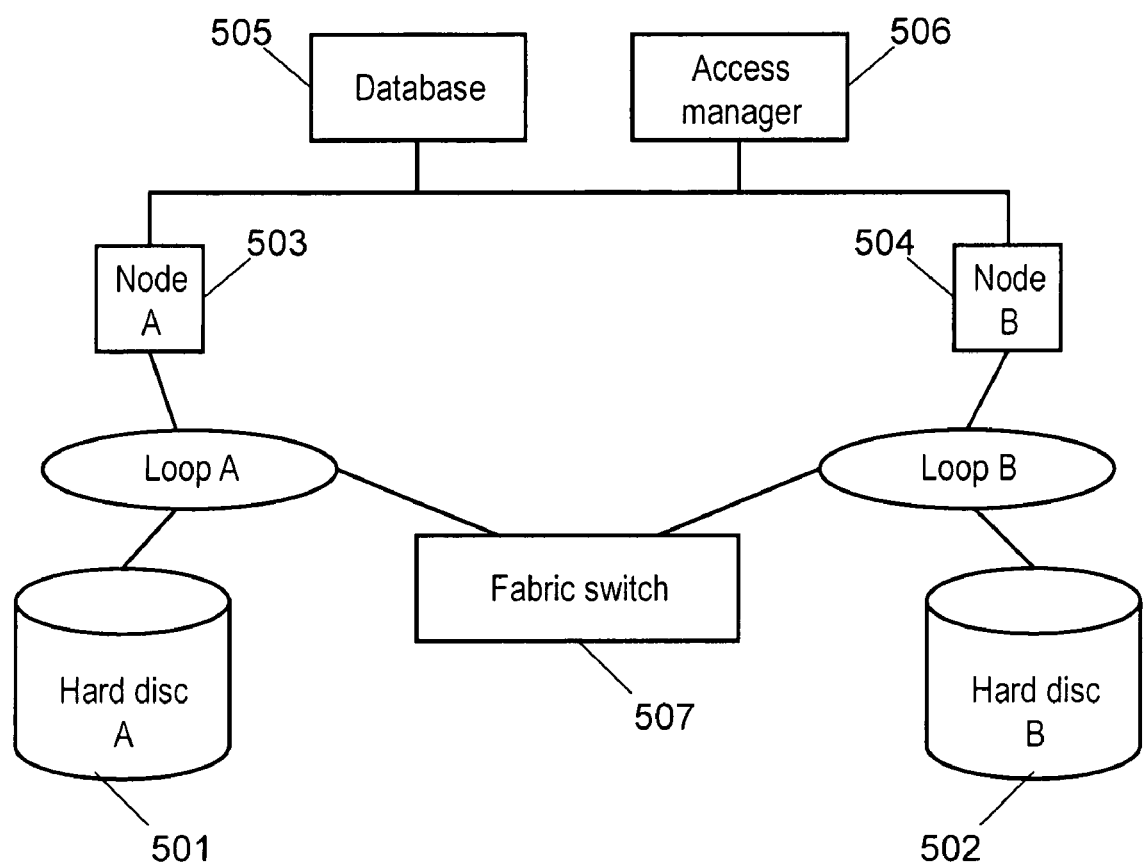
FIG. 5 is a block diagram illustrating the configuration of a network management system in a second exemplary embodiment of the present invention.
Figure 6:
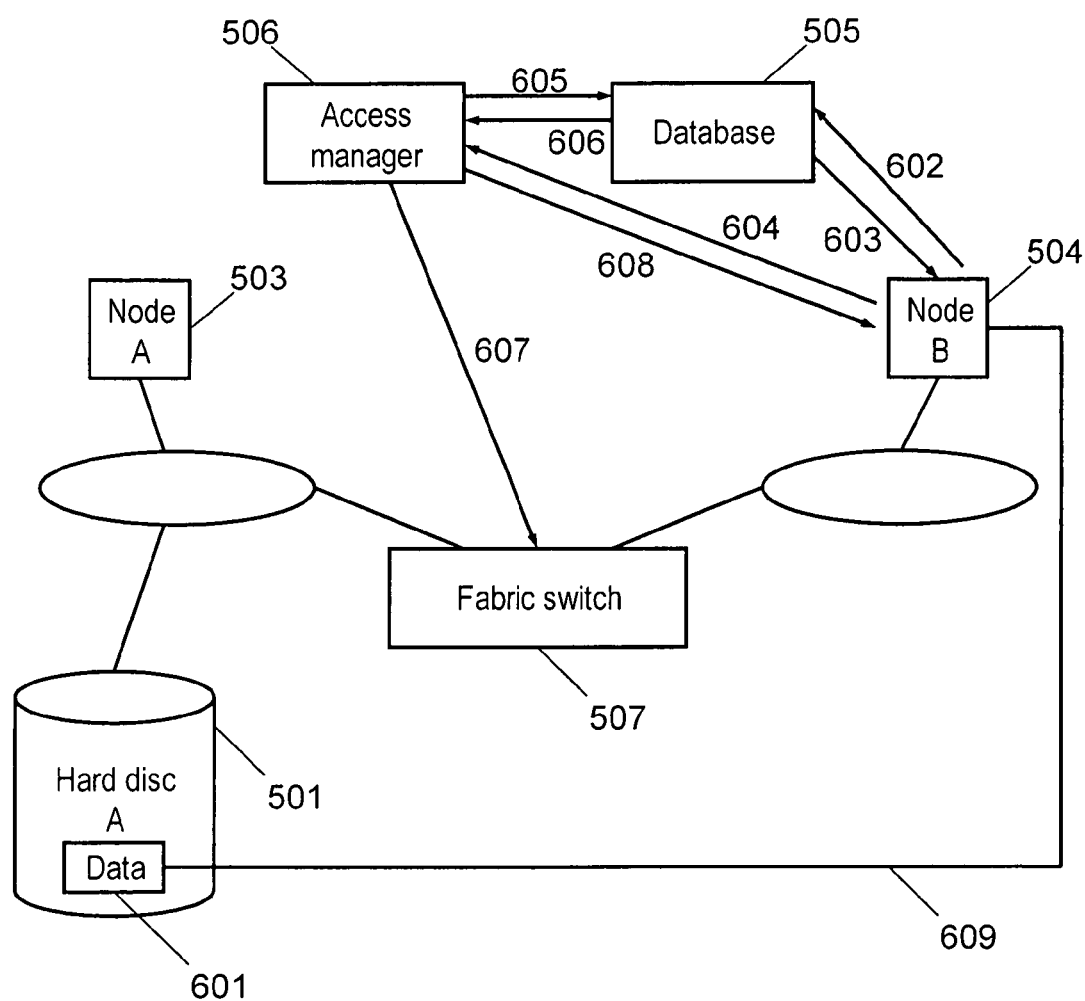
FIG. 6 is an illustration of an example of sequence of communication in the network management system.

FIG. 5 is a block diagram illustrating the configuration of a network management system in a second exemplary embodiment of the present invention. In the diagram, the network management system comprises a node A 503, node B 504, hard disc A 501 and hard disc B 502, representing a local disc at each node, database 505 which manages information pertaining to the data stored in the hard discs, access manager 506 which manages access to the data, and a fabric switch 507 as access channel managing means for establishing a communication channel between each loop. FIG. 6 is an illustration of the sequence of communication made when the node B 504 executes access to the local disc (hard disc A 501) of the node A 503. FIG. 6 is used in describing the action of each of the processing units and communication procedures in the network management system illustrated in FIG. 5.

A brief description on each of the processing units will be given in the following with reference to FIG. 6.

(1) When Having Write Access:

The node B 504 sends (604) to the access manager 506 an access request to write data 601 on the hard disc A 501.

Upon receiving the access request, the access manager 506 requests (605) the database 505 for sector write start position information on the hard disc A 501. The database 505 sends back (606) the information requested. Upon receiving the sector write start position information, the access manager 506 judges whether or not to approve the access; when sending access approval, it controls (607) the fabric switch 507 to establish an access channel after registering the access state, and securing bands in the I/O band of the hard disc and the network band. Also, the access manager 506 sends (608) the result of judgment as to whether or not to approve the access to the node B 504. When the result of the judgment is for approval of the access, the node B 504 commences (609) write access to the data 601.

(2) When Having Read Access:

The node B 504 sends (602) a data retrieval request to the database 505. The database 505 performs retrieval processing and sends back (603) the result of retrieval. At the node B 504, when a user issues an access command based on the received result of retrieval, an access request for targeted data 601 is sent (604) to the access manager 506. Upon receiving the access request, the access manager 506 requests (605) the database 505 for data management information of the data 601. The database 505 sends back (606) the data management information of the data 601. Upon receiving the data management information, the access manager 506 judges whether or not to approve the access; when sending access approval, it controls (607) the fabric switch 507 to establish an access channel after registering the access state, and securing bands in the I/O band for the hard disc and the network band. Also, the access manager 506 sends (608) the result of judgment as to whether or not to approve the access to the node B 504. When the result of judgment is for approval of the access, the node B 504 commences (609) access to the data 601.

Figure 7:
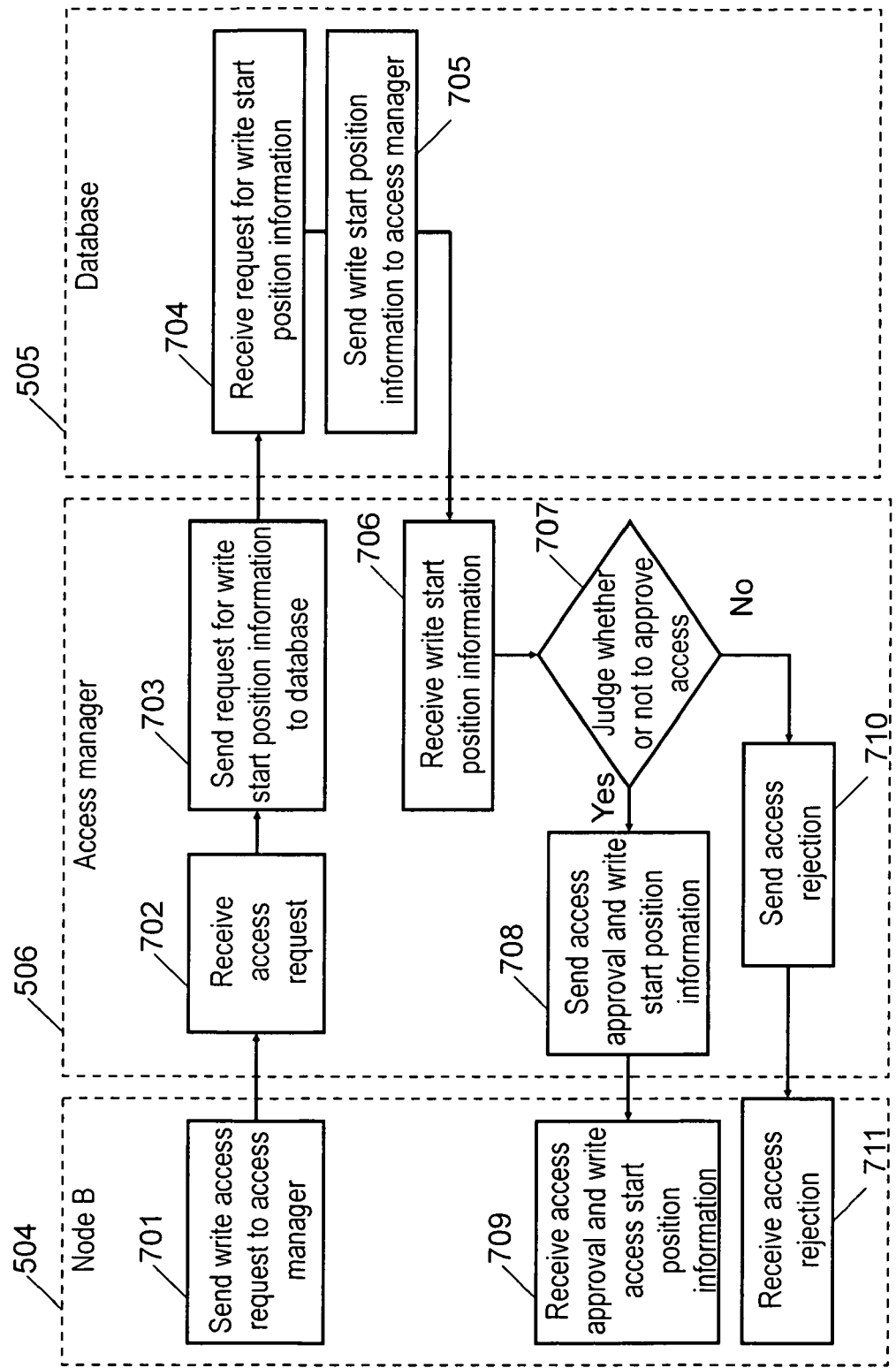
FIG. 7 is a block diagram illustrating the process of registration of data management information in the network management system.
Figure 8:
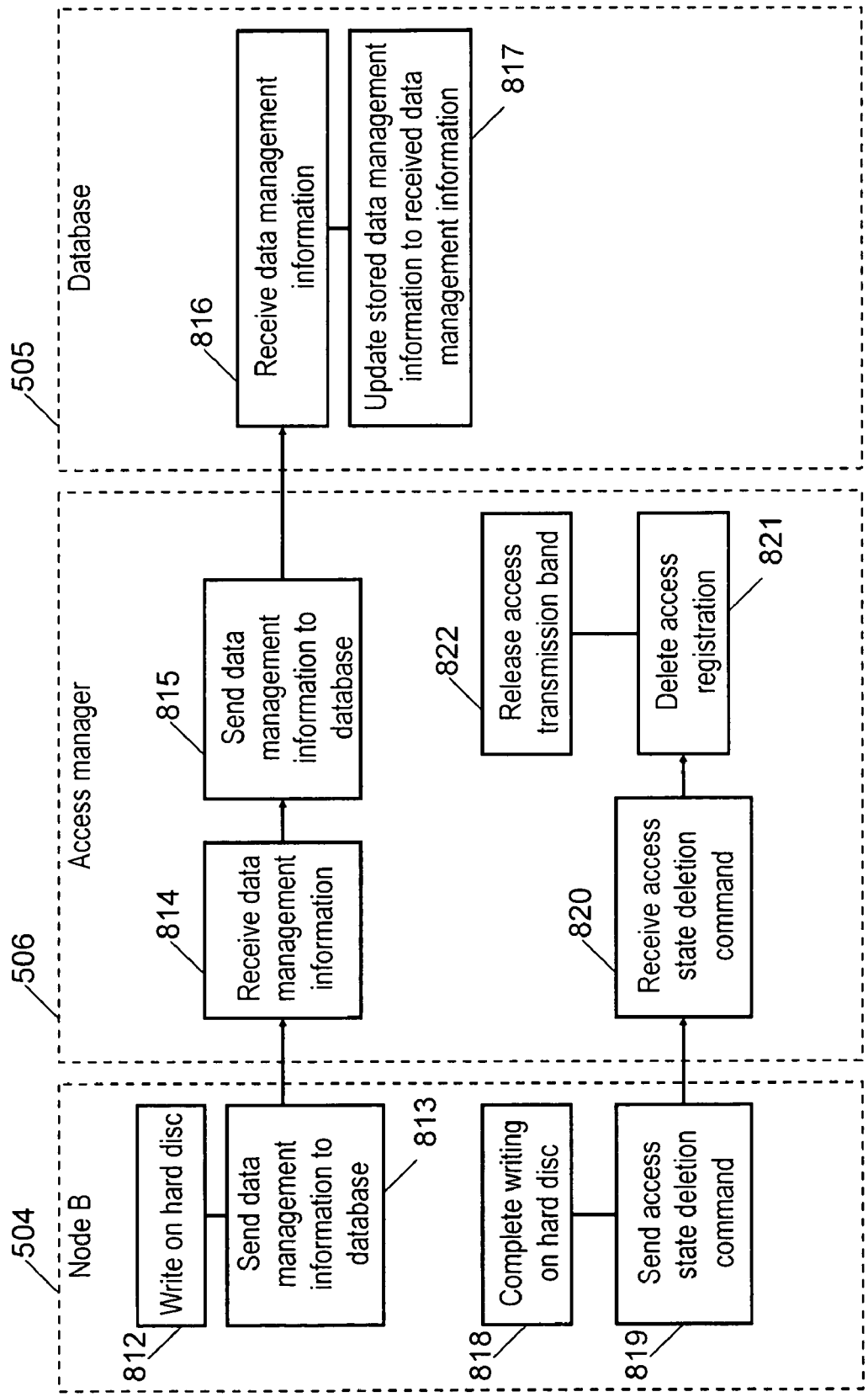
FIG. 8 is a block diagram illustrating the process of data retrieval in the network management system.
Figure 9:
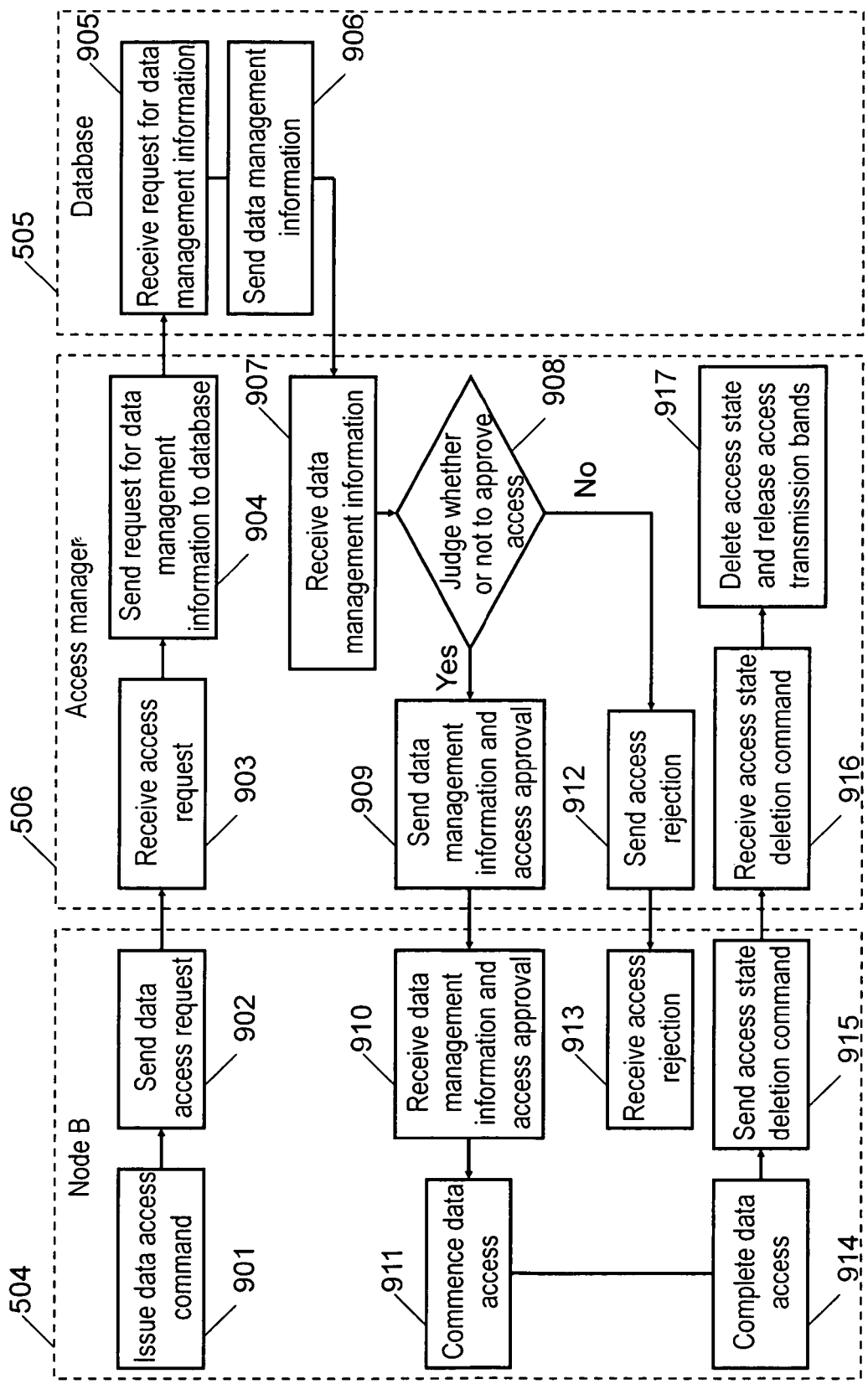
FIG. 9 is a block diagram illustrating the process of an accessing action to a remote disc in the network management system.

A detailed description of the action will now be given with reference to the processing blocks in FIGS. 7 to 9. FIG. 7 is a block diagram showing the process of registering data management information in the network management system. FIG. 8 is a block diagram showing the process of data retrieval. FIG. 9 is a block diagram showing an access action toward a remote disc.

FIGS. 7 and 8 are block diagrams illustrating the processing actions taking place when writing of the data 601 on a local disc (hard disc A 501) is executed.

First, in the processing action block diagram of FIG. 7, the processing actions from the sending of an access request until result of judgment is received will be described, followed by a description of the processing action until data management information is registered in the database in the processing action block diagram of FIG. 8.

In FIG. 7, the node B 504 sends (701) to the access manager 506 a write access request for the data 601 on a remote disc (hard disc A 501). Upon receiving (702) the access request, the access manager 506 sends (703) to the database 505 a request for sector write start position information. Upon receiving (704) it, the database 505 sends back (705) write start position information. Upon receiving (706) the information, the access manager 506 judges (707) whether or not to approve the access. When a judgment is made to approve the access, the access state is registered, and bands are secured in the I/O band for the hard disc and in the network band, and the fabric switch 507 is controlled in order to establish an access channel. Once an access channel is established, access approval and write start position information are sent out (708). After receiving them (709), the node B 504 commences access. On the other hand, when a judgment is made to reject the access, the access manager 506 sends an access rejection (710) to the node B 504, and the node B 504 receives it (711) and suspends access processing.

In FIG. 8, when the node B 504 commences writing (812) of the data 601 on the hard disc A 501 (remote disc), data management information is generated. The node B 504 sends (813) the generated data management information to the database 505 through the access manager 506. Upon receiving (814) the data management information, the access manager 506 sends (815) the data management information to the database 505. Upon receiving (816) the data management information, the database 505 reflects (817) the received data management information (updates the stored data management information with the received data management information). Also, when writing of the data 601 is completed (818), the node B 504 sends (819) an access state deletion command to the access manager 506. Upon receiving the command (820), the access manager 506 deletes (821) the access state registered at the time of access approval in the access state managing function processing unit, being an internal function, and at the same time, releases (822) the secured access transmission bands in the internal hard disc I/O band managing function processing unit and the network band managing function processing unit.

By the above described processing, data management information is managed by the database in a unified way.

Now, FIG. 9 is a block diagram illustrating the processing action when a node executes an access request to a remote disc. A description of the processing associated with the execution of the access request for data on the remote disc in a system configuration illustrated in FIG. 5 and FIG. 6 will be given in the following with reference to FIG. 9.

In the illustration, when a data access command is issued (901) by a user in the node B 504, a data access request 902 is sent to the access manager 506. After receiving (903) the access request, the access manager 506 sends (904) a request for data management information of the target data to the database 505.

Upon receiving (905) the request for the data management information, the database 505 sends (906) the data management information to the access manager 506. Upon receiving (907) the data management information, the access manager 506 judges (908) whether or not to approve the access.

When the result of judgment is (1) to approve the access, the access manager 506 sends (909) access approval as a result of judgment and the data management information to the node B 504 after registering the access state, securing access transmission bands, controlling the fabric switch, and establishing an access channel. On receiving (910) the result of judgment, the node B 504 executes access (911) to the target data on the remote disc by using the data management information and sends (915) an access state deletion command to the access manager 506 immediately upon completion (914) of the read access. After receiving (916) the access state deletion command, the access manager 506 deletes the access state in the access state managing function processing unit while releasing (917) the secured access transmission bands in the hard disc I/O band managing function processing unit and the network band managing function processing unit.

When the result of judgment is (2) to reject the access, the access manager 506 sends (912) to the node B 504 an access rejection as the result of judgment. On receiving (913) the result of judgment 913, the node B 504 suspends execution of the access to the data.

In this exemplary embodiment, although transmission bands are secured in the I/O band for the hard disc and the network band prior to informing access approval, the timing of securing bands is not limited to only prior to informing access approval.

Also, in this exemplary embodiment, although a description has been made using a fabric switch, a similar effect can be expected by the use of a device having a function of establishing a communication channel.

Additionally, a similar effect can be obtained by a system configuration in which only a shared disc (remote disc) which is readable and writable from all the nodes is connected to the fabric switch 507.

According to this exemplary embodiment, a system can be configured in which a fabric switch is provided in addition to the configuration described in the exemplary embodiment-1 and access to a local disc and a remote disc can be obtained by controlling the fabric switch by using an access manager. In other words, a system can be provided in which an access transmission band to a local disc is guaranteed without normally being conscious of other nodes. Also, by controlling the fabric switch with the access manager, a system can be provided in which it can be easily connected with other loops and an I/O band for a hard disc and a network band can be guaranteed when accessing a remote disc.

Additionally, in having access to a data stream such as video data in which a transmission band needs to be guaranteed, an I/O band for the hard disc and a network band can be guaranteed according to this exemplary embodiment.

Exemplary Embodiment—3

In a third exemplary embodiment of the present invention, a description will be given on a processing function in which access to a local disc can be guaranteed by the access manager in the network management system shown in the first and second exemplary embodiments.

Figure 10:
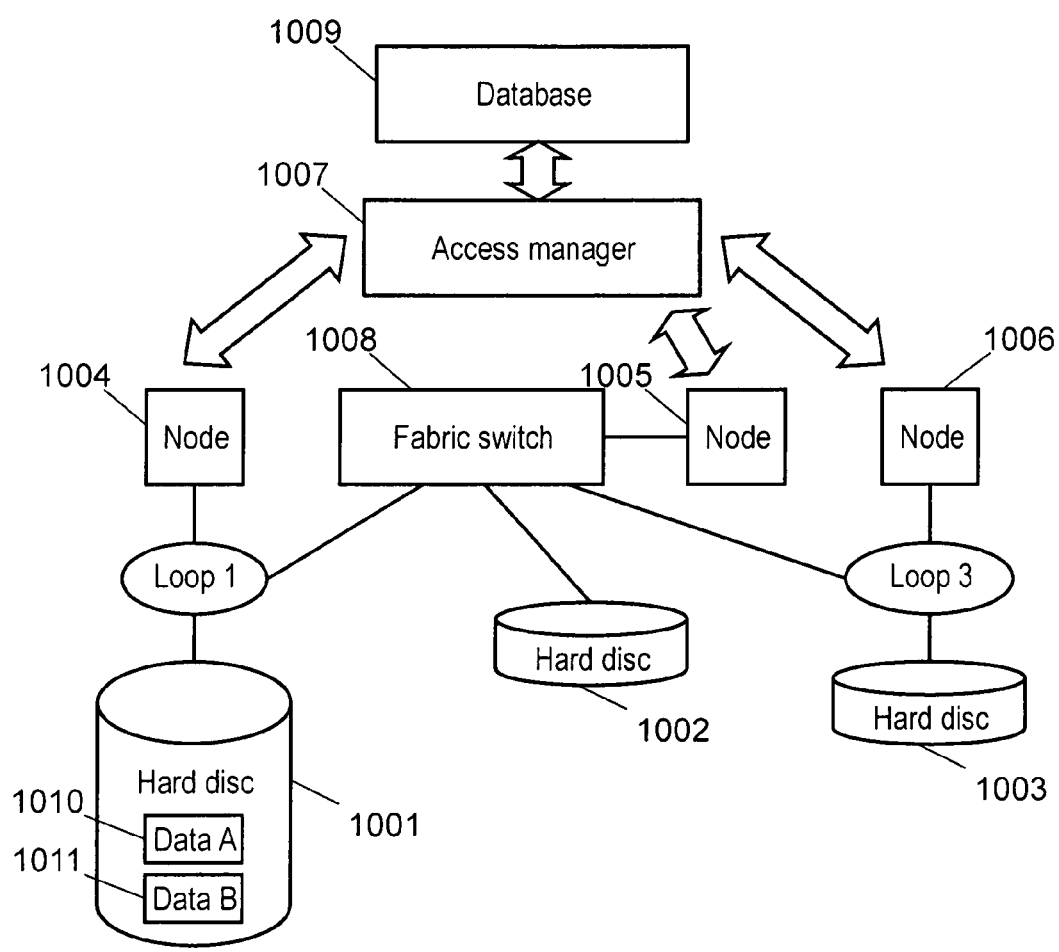
FIG. 10 is a block diagram illustrating the configuration of a network management system in a third exemplary embodiment of the present invention.

FIG. 10 is a block diagram of a system configuration illustrating processing function for guaranteeing access to a local disc. In the diagram, nodes 1004 to 1006 and hard discs 1001 to 1003, being local discs at each node, are connected to a fabric switch 1008 through a network. Each node is also connected to an access manager 1007 and a database 1009.

Referring to the diagram, a description of the processing function of the access manager with which access to a local disc is guaranteed will be given in the following taking access to a local disc as an example.

To begin with, a method of processing by the access manager 1007 will be described on a case of access in which access requests to the same data are simultaneously made by a node having a local disc and by other nodes.

Now, we assume that all the nodes 1004 to 1006 send to the access manager 1007 access requests for data A 1010 on the hard disc 1001, and the access manager 1007 receives the access requests in the order of the node 1005, node 1006, and node 1004. After receiving data management information from the database 1009, the access manager 1007 sends to each node result of judgment as to whether or not to approve the access.

Details of processing by the access manager 1007 during this process are described below.

In order to guarantee access by the node 1004 to the data A 1010 on the hard disc 1001, the access manager 1007 secures access transmission bands in advance in both the I/O band managing function processing unit of the hard disc and network band managing function processing unit of the access manager 1007. In other words, when an access request from the node 1005 for the data A 1010 is first received, the access manager 1007 manages the bands on the assumption that the remaining band left by subtracting the bands secured for access transmission by the node 1004 for the data A 1010 is the upper limit. As a result, when accessing a local disc, the access manager 1007 immediately sends to the Node 1004 approval of access to the data A 1010 and data management information. Upon receiving the access approval and the data management information, the node A 1004 commences access to the data A 1010 on the local disc.

Also, when the access manager 1007 judges that there remains a sufficient margin of band for access requests from the node 1005 and node 1006 after securing an access transmission band for the node 1004, it establishes an access channel by controlling a fabric switch function processing unit, and sends access approval and data management information to the node 1005 and node 1006. Upon receiving them, the node 1005 and node 1006 commence access to the data A 1010 on the remote disc (hard disc 1001).

However, when bands for only either one of the node 1005 or 1006 can be guaranteed, the access manager 1007 sends access approval and data management information only to the node 1005 in accordance with the order of receiving the access requests. Upon receiving the access approval and the data management information, the node 1005 commences access to the data A 1010 on the remote disc (hard disc 1001). Also, the node 1006 is rejected of its access by the access manager 1007.

Here, a similar effect is obtained when the access request of the node 1004 is for different data on the hard disc on which the data A 1010 is stored.

Also, when the node 1004 has plural local discs, a similar effect can be obtained even when the access request of the node 1004 is for different data on a hard disc (a local disc of the node 1004) which is different from the one on which the data A 1010 is stored.

According to the present exemplary embodiment, a transmission band for access to data on a local disc will be always guaranteed to each node even for posterior access even in the event simultaneous access from plural nodes is being made.

Exemplary Embodiment—4

Figure 11:
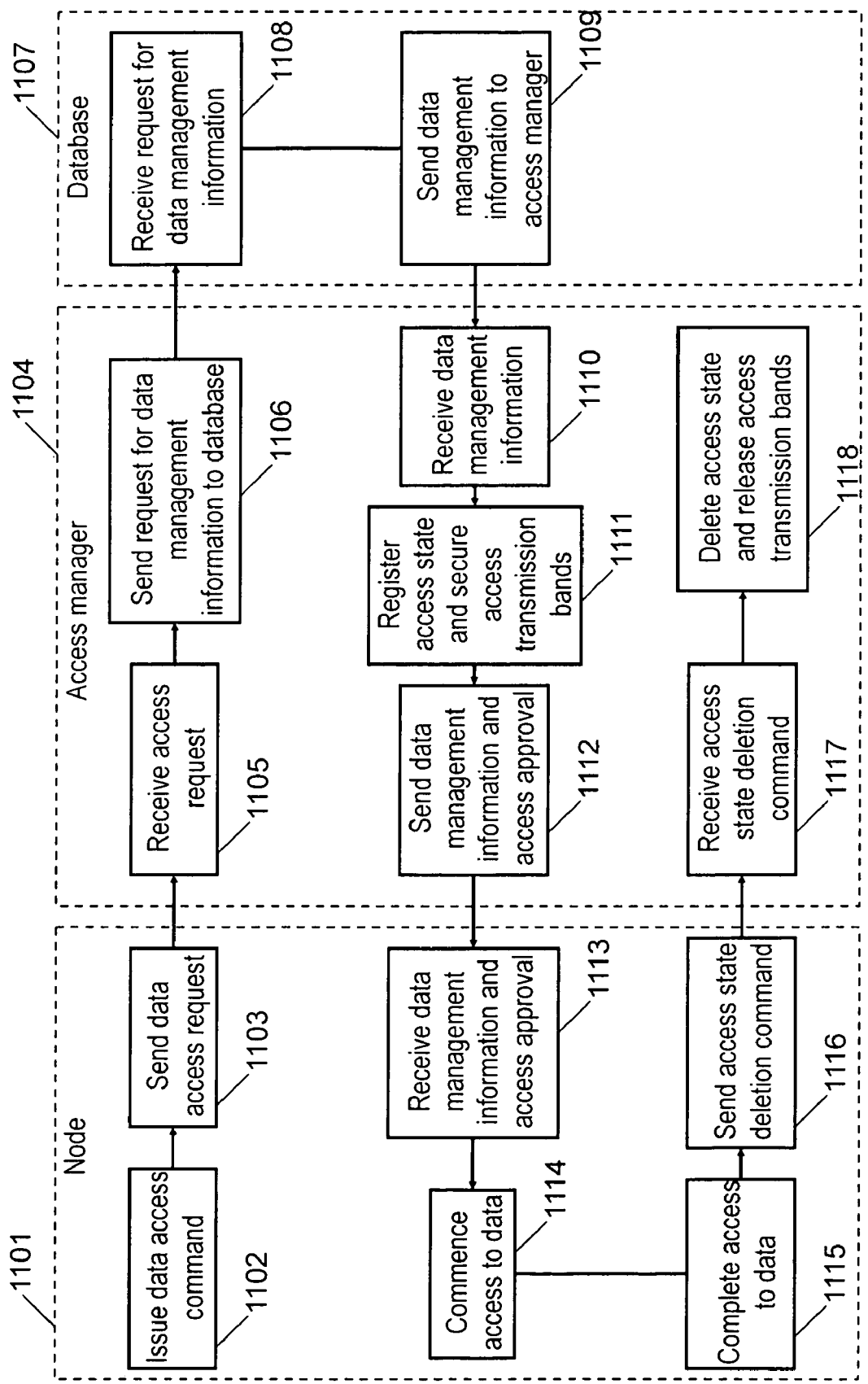
FIG. 11 is a block diagram illustrating the process of a local accessing action in a network management system in a fourth exemplary embodiment of the present invention.

As a fourth exemplary embodiment of the present invention, a description will be made referring to FIG. 11 and FIG. 9 on a processing block of the access manager function in the network management system shown in the second exemplary embodiment or the third exemplary embodiment. FIG. 11 is a block diagrammatic representation of processing when a node accesses a local disc.

As illustrated in the diagram, when a command is issued (1102) for access to data on a local disc within a node 1101, the node 1101 sends (1103) an access request to an access manager 1104 for the data. Upon receiving (1105) the access request, the access manager 1104 sends a request (1106) for data management information of the target data to a database 1107. Upon receiving (1108) the request for the data management information, the database 1107 sends (1109) the data management information of the target data for which an access request had been made to the access manager 1104. On receiving (1110) the data management information, the access manager 1104 registers the access state in the access state managing function processing unit of the access manager 1104. On the other hand, the access manager 1104 sends (1112) the data management information and access approval after securing access transmission bands (1111) in the hard disc I/O band managing function processing unit and the network band managing function processing unit. Upon receiving (1113) the data management information and the access approval, the node 1101 executes (1114) access to the data, and, on completion (1115) of the access to the data, sends (1116) an access state deletion command to the access manager 1104. Upon receiving (1117) the access state deletion command, the access manager 1104 deletes the access state in the access state managing function processing unit, and releases (1118) access transmission bands in the hard disc I/O band managing function processing unit and the network band managing function processing unit. In other words, when accessing a local disc, as shown in the third exemplary embodiment, the access manager 1104 unconditionally registers the access state and secures an I/O band for the hard disc and a band for the network except when the preceding access is write access and sends access approval and the data management information to the node 1101. Upon receiving the access approval and the data management information, the node 1101 commences access to the data.

Here, when the data management information is stored in the node 1101 and the database 1107, a similar effect is obtained in the access to the local disc by using the data management information stored in the node 1101 without communicating with the database. However, in this case, it is necessary to send only an access state registration command to the access manager 1104 in order to manage the access state.

As has been described in the second exemplary embodiment, FIG. 9 shows processing blocks when a node accesses a remote disc.

As shown in the diagram, when an access command is issued (901) within the node B 504 for data on a remote disc, the node B 504 sends (902) an access request to the access manager 506. Upon receiving (903) the access request, the access manager 506 sends (904) a request for data management information on the target data to the database 505. Upon receiving (905) the data management information, the database 505 sends (906) the data management information on the requested target data to the access manager 506. Upon receiving (907) the data management information, the access manager 506 judges (908) whether or not to approve the access. This judgment process is executed in accordance with the processing blocks described in the first exemplary embodiment, and the access manager 506 sends the result of judgment to the node B 504.

When the result of judgment is (1) to approve the access, the access manager 506 sends (909) access approval as the result of the judgment and data management information to the node B 504 after registering the access state, securing an I/O band for the hard disc and a network band, and establishing an access channel by controlling a fabric switch. On receiving (910) the result of judgment, the node B 504 commences access (911) to the target data on the remote disc using the data management information. When read access is completed (914), the node B504 immediately sends (915) an access state deletion command to the access manager 506. After receiving (916) the access state deletion command, the access manager 506 deletes the access state in the access state managing function processing unit while releasing (917) the secured access transmission bands in the hard disc I/O band managing function processing unit and the network band managing function processing unit.

When the result of judgment is (2) to reject the access, the access manager 506 sends (912) access rejection as the result of judgment to the node B 504. On receiving (913) the result of judgment, the node B 504 suspends execution of the access to the data.

According to this exemplary embodiment, the access manager can always manage the access states in all the networks by communicating the result of judgment as to whether or not to approve the access to the blocks which process access to data on a local disc and data on a remote disc in the sequence of communication shown in the exemplary embodiment. Also, by utilizing this function, the access manager can always guarantee to the local disc or the remote disc a transmission band in which access has once commenced.

Exemplary Embodiment—5

Figure 12:
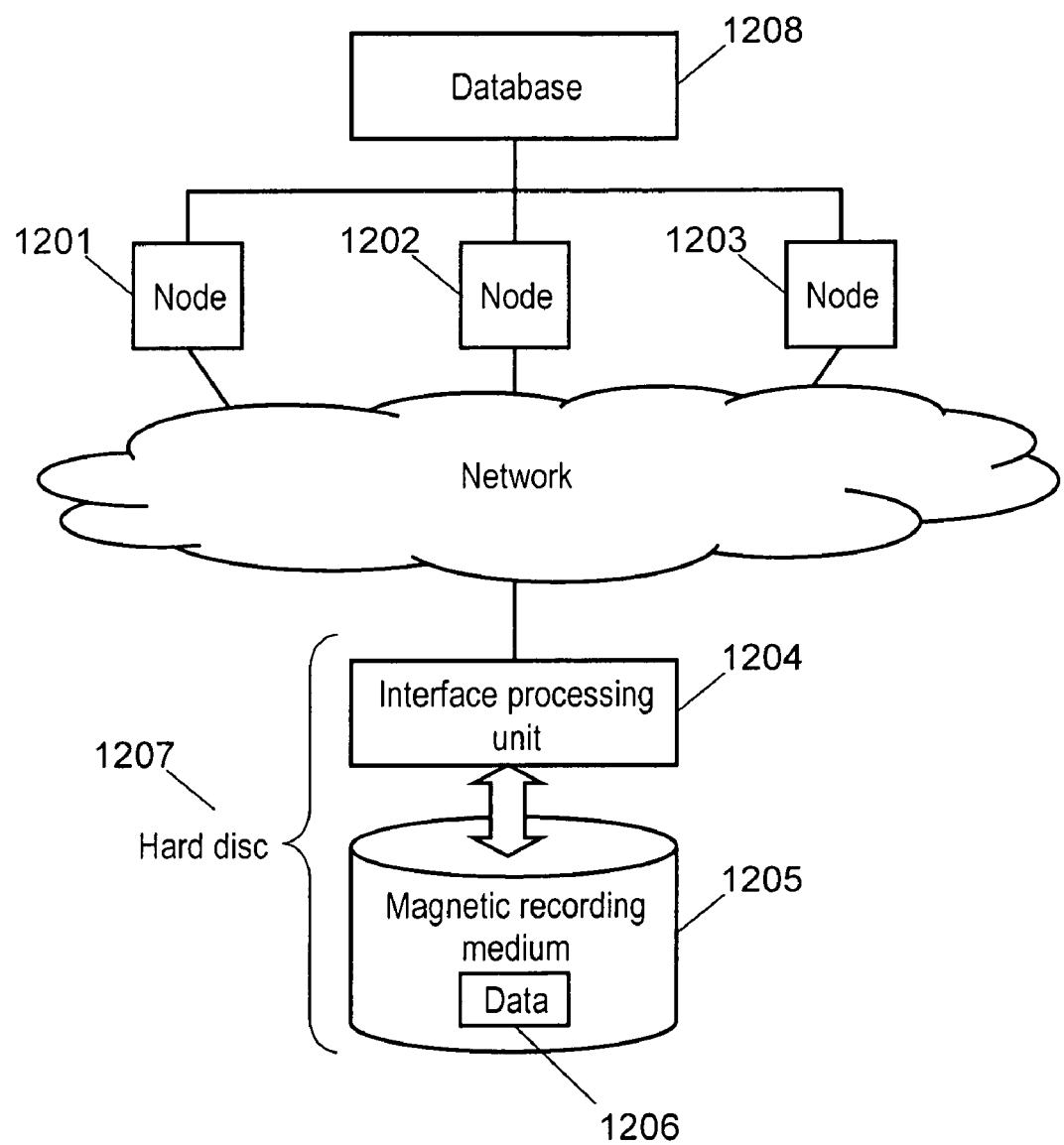
FIG. 12 is a block diagram illustrating the configuration of a network management system in a fifth exemplary embodiment of the present invention.

FIG. 12 is a block diagram illustrating a network management system in a fifth exemplary embodiment of the present invention.

In the system of this diagram, a first node 1201, a second node 1202, and a third node 1203 on a network are connected to a database, and each node is connected to a hard disc 1207 for data storage. The hard disc 1207 comprises an interface processing unit 1204 and a magnetic recording medium 1205.

A description of the action of each of the apparatuses comprising the system will be given on the case in which the right to write data and the right to delete data on the hard disc 1207 are owned only by the node 1201, for example, in the above-configured network management system. In this system, a band for the node 1201 has been secured in advance to guarantee access by the node 1201 to the hard disc 1207.

First, a description will be made on the case in which the node 1201 writes data 1206 on the hard disc 1207.

The node 1201 executes writing on a sector of the hard disc 1207 and, upon completion of writing, sends data management information of the sector to the database 1208. The database 1208 reflects the received data management information and immediately sends the reflected data management information to the node 1202 and node 1203. The node 1202 and node 1203 receive the data management information and reflect it on an internal database. Through this process, the node 1202 and node 1203 become ready to have read access to the sector on which writing has been completed without waiting for the completion of writing the data 1206 by the node 1201.

A similar effect is obtained by configuring the database 1208 in a manner such that the data management information will be sent only when additional information is requested by each node.

Next, a description will be made on the case in which simultaneous read access to the data 1206 is made from plural nodes. Each node sends a request to the hard disc 1207 for read access to the data 1206. In an interface processing unit 1204 of the hard disc 1207, when it has received the access requests in the order of the node 1202, node 1201, and 1203, for example, it judges as to whether or not to approve the access according to this order, and sends the result of judgment to the node 1202, node 1201, and node 1203. When the received result of judgment is to approve the access, each of the nodes commences access to the data 1206.

A description in detail of the function of the interface processing unit 1204 will be given in the following with reference to FIG. 13.

Figure 13:
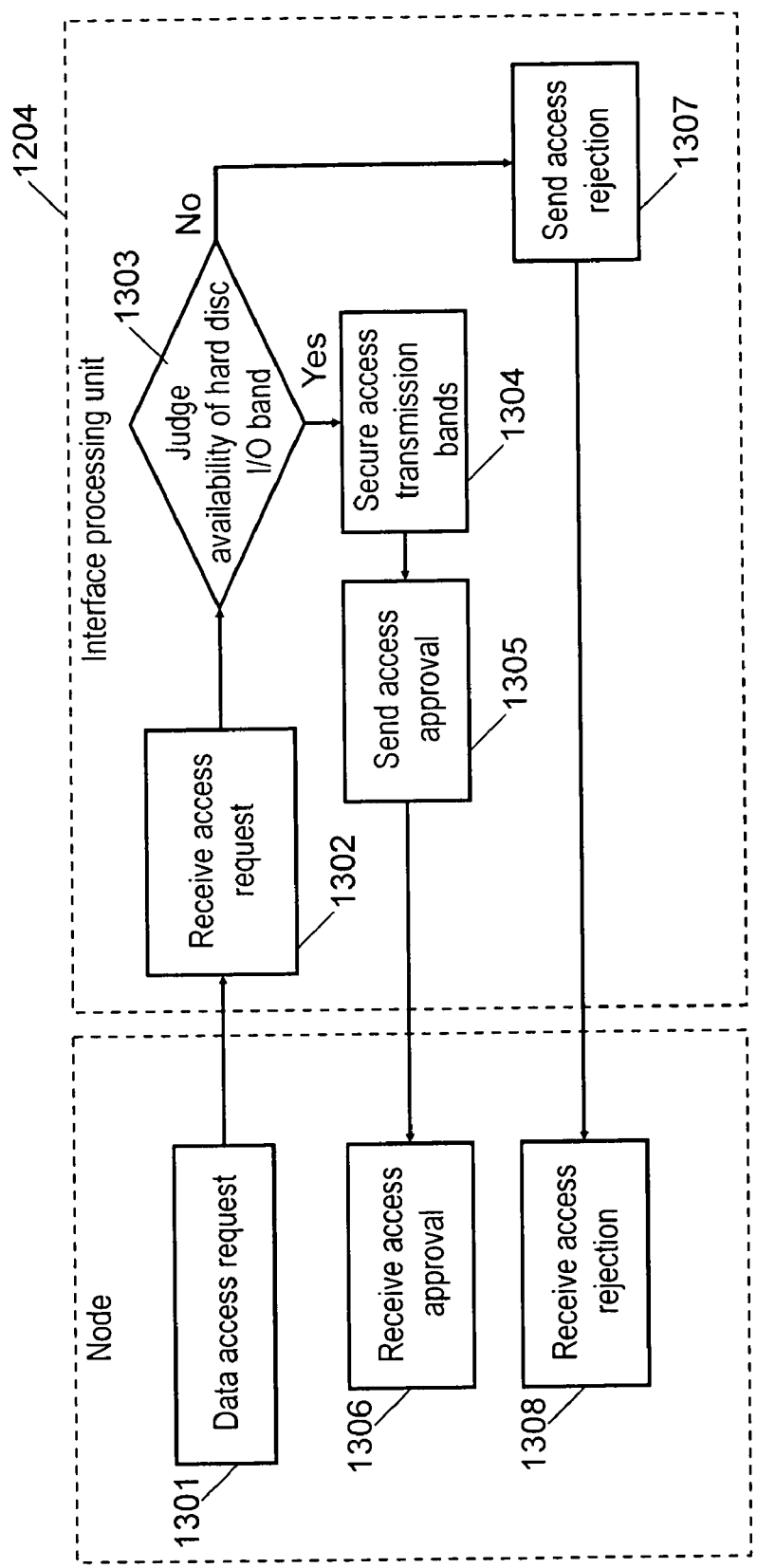
FIG. 13 is a block diagram illustrating an access management processing block incorporated in an interface processing unit of a hard disc in the network management system.

FIG. 13 is a block diagram illustrating the process of access management when an access request has been made to the hard disc 1207. In the interface processing unit 1204, each of the managing function processing units of the access manager shown in the first to fourth exemplary embodiments is incorporated.

Here, a description will be given on the processing action when only the hard disc I/O band managing function processing unit is incorporated. When access requests for the data 1206 are received (1302) by the interface processing unit 1204 from plural nodes, in the interface processing unit 1204, the internal hard disc I/O band managing function processing unit judges (1303) on each of the requests as to whether or not to approve it based on the hard disc I/O band, and sends respective results of judgment to the node 1201, node 1202, and node 1203.

As a result of judgment, (1) when to approve access, access approval, being result of judgment, is sent (1305) in the hard disc I/O transmission band after securing (1304) an access transmission band, and the node which has received (1306) the result of judgment commences access to the data 1206. However, access approval is immediately sent to the node 1201 without making judgment. Upon completion of the access, the node sends (not shown) a band release command to the interface processing unit 1204, and the interface processing unit 1204 that has received it releases the secured band.

(2) When an access rejection was sent (1307), the node that has received (1308) the result of judgment will suspend execution of access to the data 1206.

Here, when the interface processing unit 1204 is provided with other managing function processing units of the access manager shown in the first to fourth exemplary embodiments in addition to the hard disc I/O band managing function processing unit, further refined band management and access management may be made.

Furthermore, although the function of an access manager is incorporated in the interface processing unit in this exemplary embodiment, it is not limited to be incorporated in the interface processing unit and a similar effect may be obtained by incorporating the access manager function within the system, such as in a node or a file system, for example.

Also, when a hard disc is provided in each of plural nodes on a network, the node having the right to write on the disc, access in which an access transmission band for all the hard discs on the network is guaranteed is enabled by storing data management information of the whole data in the database 1208, thus providing an effect similar to that of the present exemplary embodiment. In other words, a system can be configured in which the data can be read from all the nodes though the node which can write data is limited.

Furthermore, when the recording medium apparatus handles video and audio signals as data, a system can be provided in which the video and audio signals can be stored in separate file systems by separating video and audio data.

With this exemplary embodiment, by incorporating an access manager function processing unit in the interface processing unit of a magnetic recording medium, a system can be configured in which delay due to communication is reduced, dynamic access state in a network is managed, and an access transmission band is guaranteed in all access.

Exemplary Embodiment—6

Figure 14:
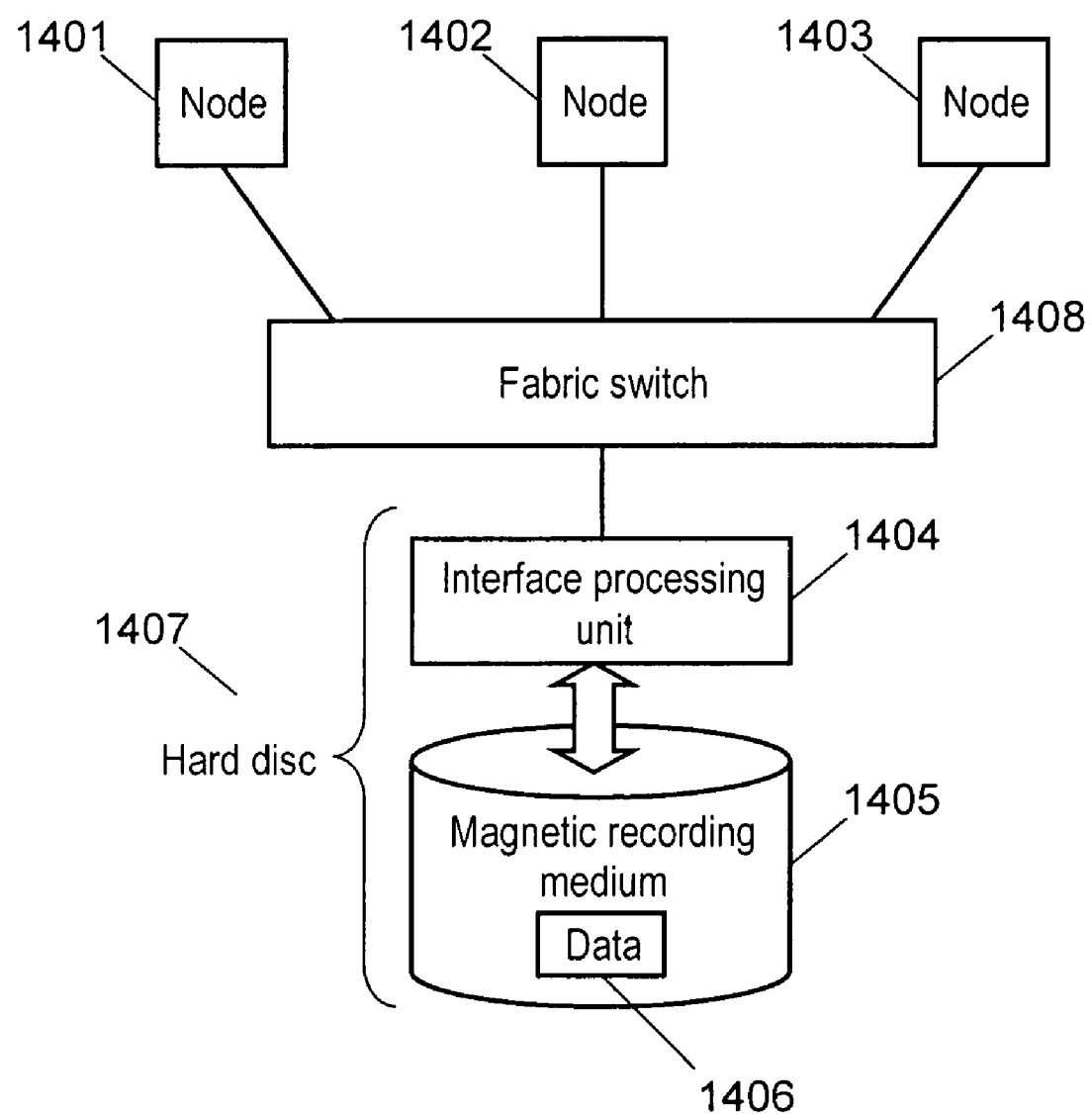
FIG. 14 is a block diagram illustrating the configuration of a network management system in a sixth exemplary embodiment of the present invention.

FIG. 14 is a block diagram illustrating the system configuration of a network management system in a sixth exemplary embodiment of the present invention, where the database function described in the first exemplary embodiment is provided within each node. A first node 1401, second node 1402, and third node 1403 are connected on a network to a hard disc 1407 for data storage through a fabric switch 1408. The hard disc 1407 comprises an interface processing unit 1404 and a magnetic recording medium 1405. Here, it is assumed that all accessible networks have been previously connected to the fabric switch 1408.

As in the fifth exemplary embodiment, an example will be described in which the right to write data and the right to delete data on the hard disc 1407 are owned only by the node 1401.

First, an example will be described in which the node 1401 writes data 1406 on the hard disc 1407.

The node 1401 stores sector-by-sector data management information, being peculiar information pertaining to the hard disc 1407 such as location of data storage and file name, which is managed by a database function processing unit provided in the node 1401. The data management information of the data 1406 is sent to the node 1401 upon completion of writing on a sector of the hard disc 1407, and the internal database function processing unit reflects the newly arriving data management information of the sector and immediately sends the reflected data management information to other nodes 1402 and 1403. Each of the node 1402 and node 1403 reflects the received data management information in its respective internally provided database function processing unit. Through this process, the node 1402 and node 1403 become ready to have read access to the sector to which writing has been completed without waiting for completion of entire writing.

Next, a description will be made of a process when simultaneous read access to data is made by plural nodes. Each node sends a read access request to the hard disc 1407 for the data 1406. On receiving the access requests in the order of the node 1403, node 1402, and node 1401, for example, the interface processing unit 1404 judges whether or not to approve the access in the order of receiving, and sends the result of judgment to the node 1401, 1402, and node 1403. When to approve access, the interface processing unit 1404 sends access approval after registering the access state and securing bands in the hard disc I/O band and the network band. The node which has received the access approval executes access to the data 1406. Also, the node which has received an access rejection suspends accessing action.

Figure 15:
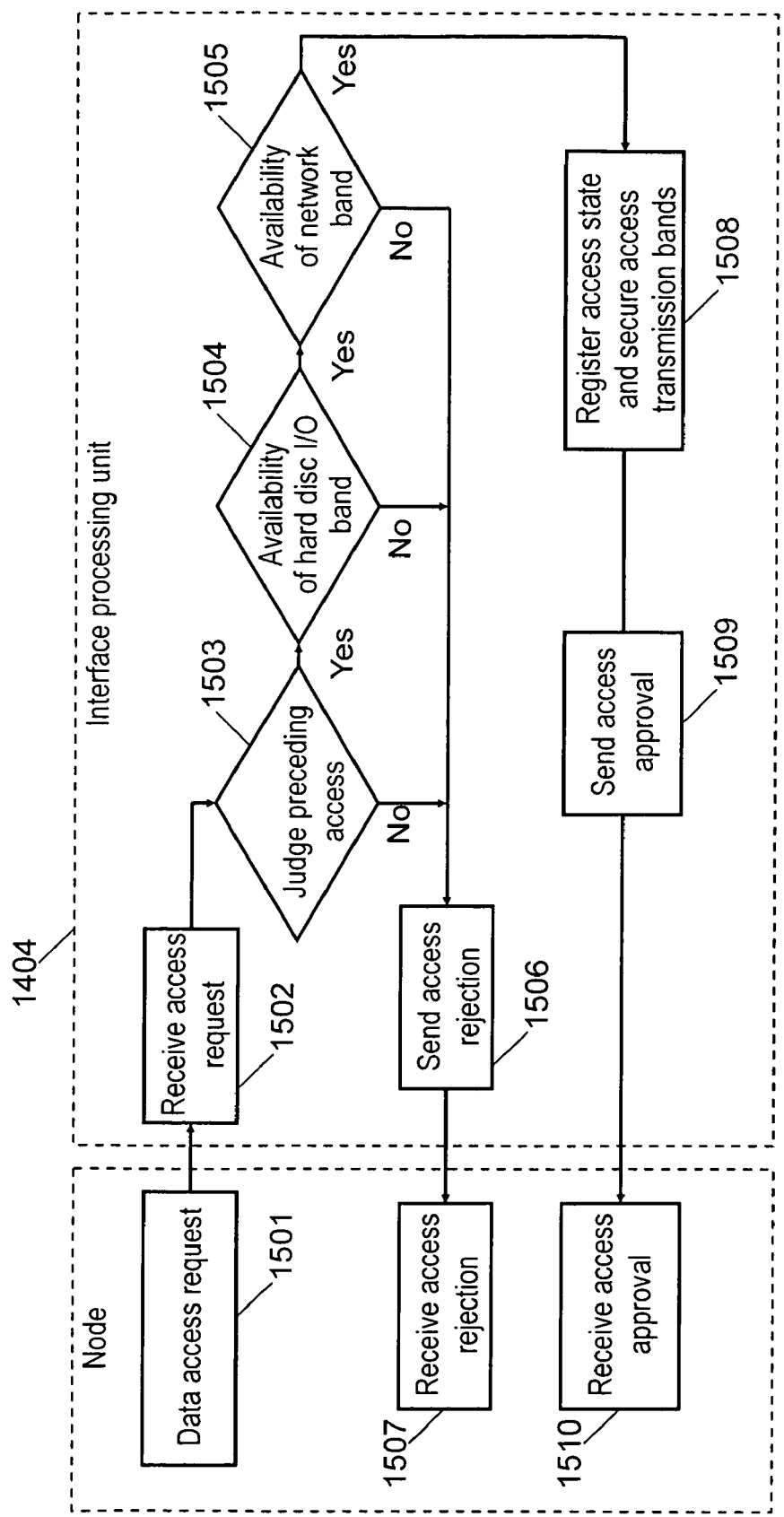
FIG. 15 is a block diagram illustrating an access management processing block incorporated in the interface processing unit of the hard disc in the network management system.

In the following, the function of the interface processing unit 1404 will be described in detail with reference to FIG. 15. FIG. 15 is a block diagram illustrating the access management process when an access request is executed toward the hard disc 1407.

Here, a description will be given on a processing action for a case in which an access state managing function processing unit, hard disc I/O band managing function processing unit, network band managing function processing unit, and fabric switch managing function processing unit have been incorporated in the interface processing unit 1404.

In the interface processing unit 1404, upon receiving (1502) read access requests for the data 1406 from plural nodes, first judgment (1503) as to whether or not to approve access is made in the beginning to judge whether there exists preceding access and the mode of the access. In this exemplary embodiment, as the preceding access is read access and the new access request is read access, the judgment process is left entirely to the succeeding hard disc I/O band managing function processing unit. In the access state managing function processing unit, an access rejection is sent (1506) to the node only when an access request is write access and the preceding access is write access. In the hard disc I/O band managing function processing unit, second judgment is made (1504) as to whether or not to approve the access; when the access band is sufficient, the access judgment is left entirely to the network band managing function processing unit. When the access band is not sufficient, an access rejection is sent (1506) to the node. Finally, a third judgment (1505) as to whether or not to approve access is made in the network band managing function processing unit, and access approval is sent (1509) when the access band is sufficient.

When the access band is insufficient, an access rejection is sent to the node. The interface processing unit 1404 sends to the node 1401, node 1402, and node 1403 respective results of judgment.

As the result of judgment, when (1) to approve access, the interface processing unit 1404 registers the access state in the access state managing function processing unit while securing (1508) access transmission bands in the internal hard disc I/O band managing function processing unit and the network band managing function processing unit, followed by sending (1509) access approval; the node which has received (1510) the result of judgment commences access to the data 1206.

When (2) an access rejection was sent (1506), the node which has received the result of judgment suspends access execution toward the data 1406.

By the way, in the case of an access rejection, a similar effect may be obtained by controlling the fabric switch 1408 from the interface processing unit 1404 and forcibly cutting off the connection.

In this exemplary embodiment, although the database function is provided within each node, a similar effect may be obtained by providing the database function within a hard disc or in the interface processing unit.

Furthermore, although a description has been given on the case in which a specific node had a right to write and a right to delete toward a certain hard disc, a similar effect may be expected when each of plural nodes owns a respective hard disc toward which it has rights to write and to delete by making each node own the data management information on all data.

Also, when an access transmission band is previously known such as in the case of a stream of video data, a similar effect may be obtained by securing an access transmission band for each node or for a specific node at the time of turning on the power supply of the node or starting up an application.

Additionally, when each node composes a network inaccessible from other nodes and a local disc is provided in that network, a similar effect may be obtained.

In this case, as no access from other nodes is obtained to the local disc, no access competition will take place, making intervention of an access manager unnecessary.

According to this exemplary embodiment, by incorporating an access manager function processing unit in the interface processing unit and a database function processing unit within each node, a function of managing dynamic access state in the network can be realized while reducing delay due to communication.

Also, according to this exemplary embodiment, it is possible to forcibly cut off the access channel by controlling the fabric switch.

Exemplary Embodiment—7

Figure 16:
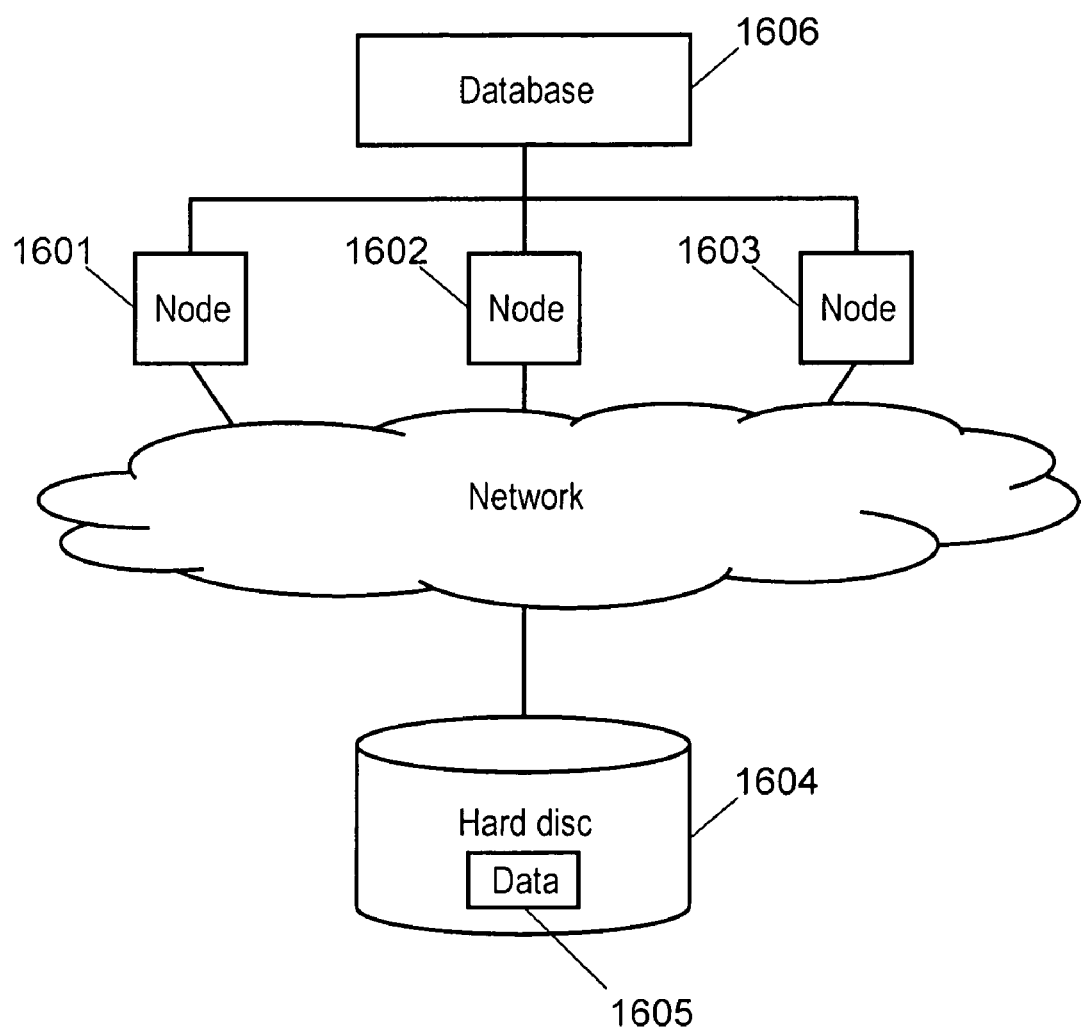
FIG. 16 is a block diagram illustrating the configuration of a network management system in a seventh exemplary embodiment of the present invention.
Figure 17:
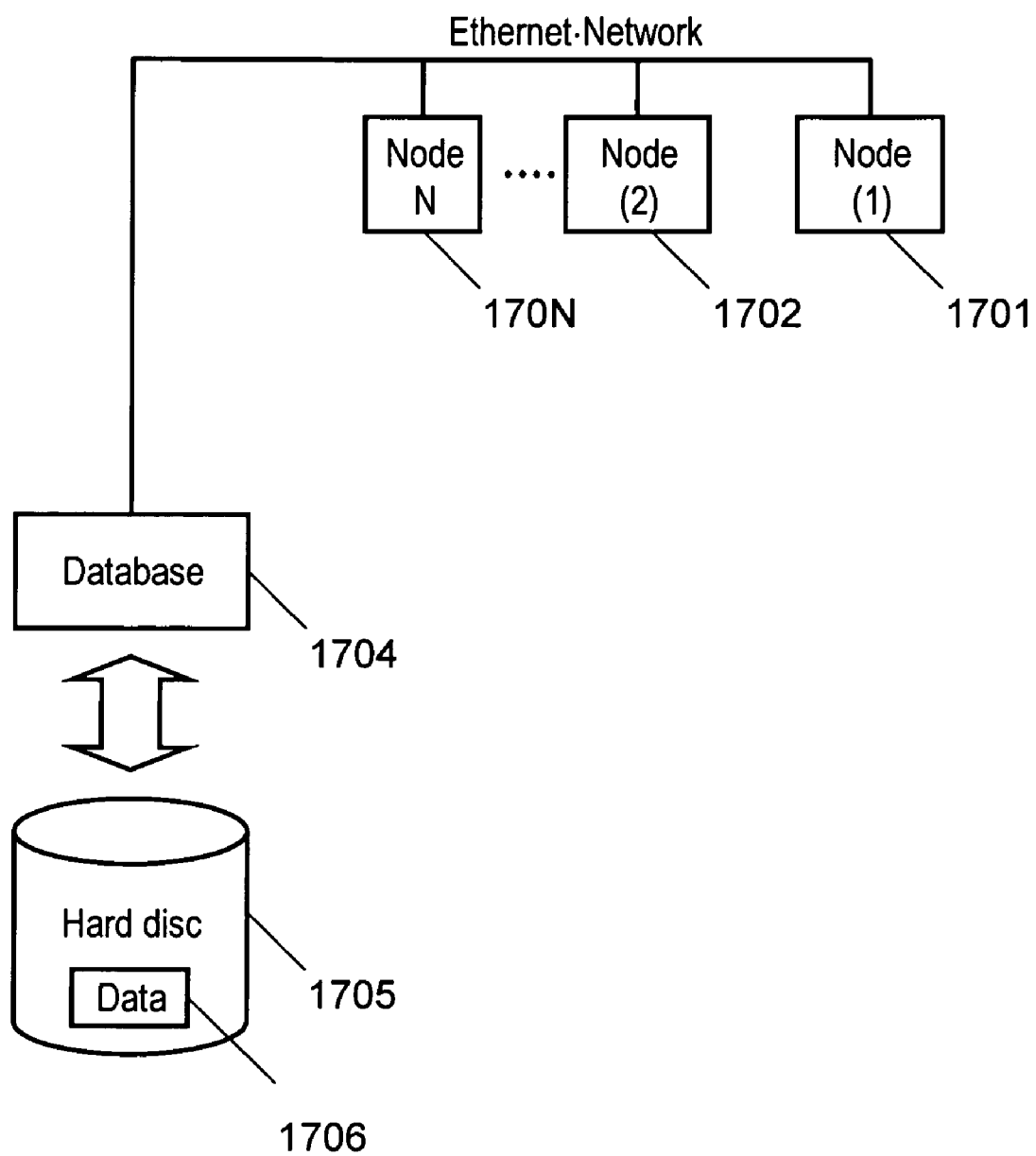
FIG. 17 is a block diagram illustrating the configuration of a prior art network management system.

In this exemplary embodiment, a description will be given on a shared-disc system using a file system in which data management information is not stored on a system disc. FIG. 16 is a block diagram illustrating configuration of a network management system in accordance with a seventh exemplary embodiment of the present invention. In the system of the diagram, a first node 1601, second node 1602, and a third node 1603 on a network are connected to a database 1606, and each node is connected to a hard disc 1604 for data storage through the network.

In this system, an example will be described on a case in which the right to write data and the right to delete data on the hard disc 1604 are owned only by the node 1601.

First, a description will be given on a case in which the node 1601 has written data 1605 on the hard disc 1604.

Upon completion of writing on a sector of the hard disc 1604, the node 1601 sends data management information of the sector to the database 1606. The database 1606 reflects the received data management information and then immediately sends added data management information to the node 1602 and node 1603 through the network. The node 1602 and node 1603 reflect the received data management information in an internal database. Through this process, the node 1602 and node 1603 become ready to have read access to the sector on which writing has been completed without waiting for completion of entire writing of the data 1605 by the node 1601.

Here, the database 1606 may be configured in a manner such that it sends data management information only when additional information is requested by each node.

When the node 1601 has deleted the data 1605, the node 1601 sends a registration deletion command to the database 1606, and the database 1606 deletes the data management information of the data 1605.

In this case, however, in order to guarantee access to the data 1605 by other nodes, the following processing is performed. As the first processing, deletion of only the data management information of the data is performed within the node 1601 and recording region of the hard disc 1604 in which the data has been stored is not released. Also, as the second processing, data management information updated on the database 1606 is not sent to other nodes. In other words, the database 1606 sends to other nodes only the data management information of the data on which data writing has been performed and does not send when deletion has been made.

By performing the above processing, access by other nodes to the deleted data becomes possible even when the data has been deleted by the node 1601 which has the right to write. However, though no problem is caused when there remains sufficient storage capacity for writing on the hard disc 1604, this method suffers a big problem when the capacity is insufficient. Consequently, when the writable capacity of the disc is insufficient, the node 1601 sends a data deletion notice to all the nodes in order to secure a space for writing data. When a response is received from each node accepting the data deletion notice, the node 1601 sends to the database 1606 a command for sending data management information of the deleted data to the node 1602 and node 1603. On the other hand, a processing for releasing the recording region in which the deleted data had been stored is performed within the node 1601. Upon receiving the command, the database 1606 immediately sends to the node 1602 and node 1603 the data management information in which the data has been deleted. The node 1602 and node 1603 which have received the data management information in which the data had been deleted update the data management information in their possession to the received data management information.

The node 1601 executes writing of new data after access by other nodes to the deleted data has been through.

Also, when a response of rejection of the deletion notice is received from other nodes, the node 1601 will not issue a command to the database 1606 for sending the data management information in which the data has been deleted. However, when there is no response to the deletion notice or when repeated responses of rejection of the deletion notice are received, the node 1601 may issue a command to the database 1606 as the case may be.

A similar effect may be obtained when the database 1606 is incorporated within a node.

Additionally, by providing the access manager shown in the first to the fourth exemplary embodiments within a network, a system may be configured in which an access transmission band for data is guaranteed.

Also, although the functions of the database and the access manager are possessed as separate hardware in this exemplary embodiment, a similar effect may be obtained by putting each function into the same hardware.

According to this exemplary embodiment, in a file system in which data management information is not stored in a system disc, data deleted by a node can be accessed by other nodes.

Each of the above exemplary embodiments can not only be put to practice by itself, but it can also be put to practice in combination with other embodiments.

When simultaneous access from plural nodes is being executed, as a transmission band to be used for each of the access can be managed in the present invention as has been described above, an access band can be guaranteed when having access to a stream of data such as video data in which a transmission band has to be guaranteed.

Also, even when simultaneous access from plural nodes is being made, a transmission band for accessing to data on a local disc can always be guaranteed for each node even for backdoor access.

Furthermore, by incorporating a access manager function processing unit in the interface processing unit of a magnetic recording medium, and a database function within each node, a system may be configured in which delay due to communication is reduced and dynamic access state in a network is managed, and an access transmission band is guaranteed in all access.

In this way, a network management system can be realized in which a data transmission band is always guaranteed once access to data is executed during simultaneous access by plural nodes.

What is claimed is:

1. A network management system comprising:
   a plurality of nodes;
   a recording medium apparatus operable to store data, said recording medium apparatus being connected to said nodes through a network;
   a data manager operable to manage physical information of the data of said recording medium apparatus, distinctive information and security information concerning the data, and system configuration information of the network; and
   an access manager operable to manage access to the data of said recording medium apparatus, said access manager being operable to judge whether or not to approve the access from the information of said data manager, a kind of access, a band state of the network and a band state of an interface of said recording medium apparatus, and to secure a transmission band for accessing the data, when the access is approved,
   wherein said nodes are operable to query said access manager, in accessing said recording medium apparatus, whether or not the access can be approved, and to act in accordance with the response of said access manager,
   wherein said access manager is operable to investigate an access state of said recording medium apparatus and to send access approval to a querying node, if: (a) a preceding access is a write access, and a present access request is a read access, (b) the preceding access is a read access, or (c) no preceding access exists; if a first access band is secured in an I/O band of said recording medium apparatus; and if a second access band is secured in a band of the network, and
   wherein the querying node that has received access approval from said access manager is operable to commence access to the data.

2. A network management system comprising:
   a plurality of nodes;
   a recording medium apparatus operable to store data, said recording medium apparatus being connected to said nodes through a network;
   a data manager operable to manage physical information of the data of said recording medium apparatus, distinctive information and security information concerning the data, and system configuration information of the network;
   an access manager operable to manage access to the data of said recording medium apparatus, said access manager being operable to judge whether or not to approve the access from the information of said data manager, a kind of access, a band state of the network and a band state of an interface of said recording medium apparatus, and to secure a transmission band for accessing the data, when the access is approved; and
   an access channel manager operable to establish an access channel by control of said access manager, when access to the data cannot be done by an ordinary channel,
   wherein said nodes are operable to query said access manager, in accessing said recording medium apparatus, whether or not the access can be approved, and to act in accordance with the response of said access manager,
   wherein said access manager is operable to investigate an access state of said recording medium apparatus and to send access approval to a querying node, if: (a) a preceding access is a write access, and a present access request is a read access, (b) the preceding access is a read access, or (c) no preceding access exists; if a first access band is secured in an I/O band of said recording medium apparatus; and if a second access band is secured in a band of the network, and
   wherein the querying node that has received access approval from said access manager is operable to commence access to the data.

3. The network management system of claim 1, wherein said access manager means is further operable to judge, when an access request to data has been received from any one of said nodes, whether or not to approve the access based on information from said access manager, and to send the result of judgment back to said nodes.

4. The network management system of claim 2, wherein said access manager means is further operable to judge, when an access request to data has been received from any one of said nodes, whether or not to approve the access based on information from said access manager, and to send the result of judgment back to said nodes.

5. The network management system of claim 1, wherein said access manager is further operable to send, when sending access approval as a result of judging whether or not to approve the access, the result of judgment to said nodes after securing a transmission band for accessing.

6. The network management system of claim 2, wherein said access manager is further operable to send, when sending access approval as a result of judging whether or not to approve the access, the result of judgment to said nodes after securing a transmission band for accessing.

7. The network management system of claim 2, wherein said access manager is further operable to control said access channel manager to establish the access channel, to manage load status of the network, and to acquire a network load status as stored in said access channel manager.

8. The network management system of claim 1, wherein said access manager is operable to control a predetermined node to secure in advance a transmission band required for access to a recording medium apparatus allocated to said predetermined node.

9. The network management system of claim 2, wherein said access manager is operable to control a predetermined node to secure in advance a transmission band required for access to a recording medium apparatus allocated to said predetermined node.

10. The network management system of claim 1, wherein one of said nodes is operable to send, in accessing said recording medium apparatus, an access request to said access manager, and wherein, upon receiving the access request, said access manager is operable to send to said data manager a request for information pertaining to data or said recording medium apparatus, and upon receiving the requested information from said data manager, said access manager is operable to judge whether or not to approve the access.

11. The network management system of claim 2, wherein one of said nodes is operable to send, in accessing said recording medium apparatus, an access request to said access manager, and wherein, upon receiving the access request, said access manager is operable to send to said data manager a request for information pertaining to data or said recording medium apparatus, and upon receiving the requested information from said data manager, said access manager is operable to judge whether or not to approve the access.

12. The network management system of claim 1, wherein said access manager is provided in said recording medium apparatus or one of said nodes.

13. The network management system of claim 2, wherein said access manager is provided in said recording medium apparatus or one of said nodes.

14. The network management system of claim 1, wherein said data manager is provided in one of said nodes or said recording medium apparatus.

15. The network management system of claim 2, wherein said data manager is provided in one of said nodes or said recording medium apparatus.

16. The network management system of claim 2, wherein said access manager is further operable to control said access channel manager and to cut off the access channel.

17. The network management system of claim 2, wherein said access channel manager is further operable to control a configuration and access state of the network connected to each port of said access channel manager.

18. A network management system according to claim 1, wherein a predetermined node or said data manager is operable to manage data management information on the data separately from the data thereby to allow deletion of only the data management information when said predetermined node deletes the data.

19. The network management system of claim 18, wherein access to the data deleted by said predetermined node is made accessible from a node other than said predetermined node.

20. The network management system of claim 1, wherein said recording medium apparatus is divided into video and audio sections each of which is operable to respectively use a separate file system.

21. The network management system of claim 2, wherein said recording medium apparatus is divided into video and audio sections each of which is operable to respectively use a separate file system.

22. The network management system of claim 18, wherein said recording medium apparatus is divided into video and audio sections each of which is operable to respectively use a separate file system.

23. The network management system of claim 1, wherein said data manager is further operable to receive newly generated management information each time writing or deleting of data on said recording medium apparatus is made, and to internally reflect the newly generated management information.

24. The network management system of claim 2, wherein said data manager is further operable to receive newly generated management information each time writing or deleting of data on said recording medium apparatus is made, and to internally reflect the newly generated management information.

25. The network management system of claim 18, wherein said data manager is further operable to receive newly generated management information each time writing or deleting of data on said recording medium apparatus is made, and to internally reflect the newly generated management information.

26. The network management system of claim 1, wherein said data manager is further operable to manage and send system configuration information of the network.

27. The network management system of claim 2, wherein said data manager is further operable to manage and send system configuration information of the network.

28. The network management system of claim 18, wherein said data manager is further operable to manage and send system configuration information of the network.

29. The network management system of claim 1, wherein said data manager is further operable to send management information based on a request from a node.

30. The network management system of claim 2, wherein said data manager is further operable to send management information based on a request from a node.

31. The network management system of claim 18, wherein said data manager is further operable to send management information based on a request from a node.

32. A network management system according to claim 2, wherein a predetermined node or said data manager is operable to manage data management information on the data separately from the data thereby to allow deletion of only the data management information when said predetermined node deletes the data.

33. A network management system of claim 1,
wherein the network is comprised of a first network and a second network,
wherein said plurality of nodes are coupled with the first and second networks,
wherein said data manager and said access manager are coupled only with the first network, and
wherein said recording media apparatus is coupled only with the second network.

34. A network management system of claim 2,
wherein the network is comprised of a first network and a plurality of second networks,
wherein said plurality of nodes are coupled with the first network and one of the plurality of second networks,
wherein said data manager and said access manager are coupled only with the first network, and
wherein said recording media apparatus is coupled only with one of the plurality of second networks.

35. A network management system of claim 2,
wherein the network is comprised of a first network and a plurality of second networks,
wherein said plurality of nodes are coupled with the first network,
wherein said plurality of nodes are additionally coupled with one of the plurality of second networks or said access channel manager,
wherein said data manager and said access manager are coupled only with the first network, and
wherein said recording media apparatus is coupled only with one of the plurality of second networks or said access channel manager.

36. A node for network connection to a recording medium apparatus operable to store data, said node comprising:
a data manager operable to manage physical information of the data of the recording medium apparatus, distinctive information and security information concerning the data, and system configuration information of the network; and
an access manager operable to manage access to the data of the recording medium apparatus, said access manager being operable to judge whether or not to approve the access from the information of said data manager, a kind of access, a band state of the network and a band state of an interface of the recording medium apparatus, and to secure a transmission band for accessing the data, when the access is approved,
wherein said node is operable to query said access manager, in accessing the recording medium apparatus, whether or not the access can be approved, and to act in accordance with the response of said access manager,
wherein said access manager is operable to investigate an access state of the recording medium apparatus and to send access approval to said node, if: (a) a preceding access is a write access, and a present access request is a read access, (b) the preceding access is a read access, or (c) no preceding access exists; if a first access band is secured in an I/O band of the recording medium apparatus; and if a second access band is secured in a band of the network, and
wherein said node is operable to commence access to the data.

37. A recording medium apparatus for storing data and for network connection to a node, said recording medium apparatus comprising:
a data manager operable to manage physical information of the data of said recording medium apparatus, distinctive information and security information concerning the data, and system configuration information of the network; and
an access manager operable to manage access to the data of said recording medium apparatus, said access manager being operable to judge whether or not to approve the access from the information of said data manager, a kind of access, a band state of the network and a band state of an interface of said recording medium apparatus, and to secure a transmission band for accessing the data, when the access is approved,
wherein said access manager is operable to receive queries from the node, in accessing said recording medium apparatus, whether or not the access can be approved, and the node is operable to act in accordance with the response of said access manager,
wherein said access manager is operable to investigate an access state of said recording medium apparatus and to send access approval to the node, if: (a) a preceding access is a write access, and a present access request is a read access, (b) the preceding access is a read access, or (c) no preceding access exists; if a first access band is secured in an I/O band of said recording medium apparatus; and if a second access band is secured in a band of the network, and
wherein the node is operable to commence access to the data.

* * * * *

UNITED STATES PATENT AND TRADEMARK OFFICE
CERTIFICATE OF CORRECTION

| | |
|---|---|
| PATENT NO. | : 7,072,954 B1 |
| APPLICATION NO. | : 09/536633 |
| DATED | : July 4, 2006 |
| INVENTOR(S) | : Toshihiro Ezaki et al. |

It is certified that error appears in the above-identified patent and that said Letters Patent is hereby corrected as shown below:

ON THE TITLE PAGE

Item 56 right column, under Other Publications, line 3, please replace "System Science," with --System Sciences,--.

Signed and Sealed this

Nineteenth Day of December, 2006

JON W. DUDAS
*Director of the United States Patent and Trademark Office*